(12) United States Patent
Garner et al.

(10) Patent No.: US 10,803,124 B2
(45) Date of Patent: Oct. 13, 2020

(54) TECHNOLOGICAL EMERGENCE SCORING AND ANALYSIS PLATFORM

(71) Applicant: SEARCH TECHNOLOGY, INC., Norcross, GA (US)

(72) Inventors: Jon G. Garner, Norcross, GA (US); Stephen F. Carley, Norcross, GA (US); Nils C. Newman, Norcross, GA (US); Alan L Porter, Norcross, GA (US)

(73) Assignee: Search Technology, Inc., Peachtree Corners, GA (US)

( * ) Notice: Subject to any disclaimer, the term of this patent is extended or adjusted under 35 U.S.C. 154(b) by 85 days.

(21) Appl. No.: 15/803,185

(22) Filed: Nov. 3, 2017

(65) Prior Publication Data

US 2018/0129755 A1    May 10, 2018

Related U.S. Application Data

(60) Provisional application No. 62/420,295, filed on Nov. 10, 2016.

(51) Int. Cl.
| | |
|---|---|
| *G06F 16/903* | (2019.01) |
| *G06Q 10/10* | (2012.01) |
| *G06Q 10/04* | (2012.01) |
| *G06F 7/50* | (2006.01) |
| *G06F 17/18* | (2006.01) |
| *G06F 17/40* | (2006.01) |

(52) U.S. Cl.
CPC .......... *G06F 16/90335* (2019.01); *G06F 7/50* (2013.01); *G06F 17/18* (2013.01); *G06F 17/40* (2013.01); *G06Q 10/04* (2013.01); *G06Q 10/10* (2013.01)

(58) Field of Classification Search
CPC .................................................. G06F 16/3322
See application file for complete search history.

(56) References Cited

U.S. PATENT DOCUMENTS

| | | | | |
|---|---|---|---|---|
| 5,941,944 | A | * 8/1999 | Messerly | G06F 16/10 709/203 |
| 9,953,043 | B1 | * 4/2018 | Sloan | G06F 16/2228 |
| 10,210,295 | B2 | * 2/2019 | Rosenbluth | G03F 1/36 |
| 2006/0155751 | A1 | * 7/2006 | Geshwind | G06F 16/3322 |

(Continued)

FOREIGN PATENT DOCUMENTS

| | | |
|---|---|---|
| WO | 2016040304 A1 | 3/2016 |
| WO | PCT/US2017/60028 | 11/2017 |

OTHER PUBLICATIONS

International Search Report and Written Opinion; dated Jan. 18, 2018 by the International Searching Authority for Intl. Pat. App. No. PCT/US2017/060028; 11 pages.

(Continued)

*Primary Examiner* — Mohammad S Rostami
(74) *Attorney, Agent, or Firm* — Bekiares Eliezer LLP

(57) ABSTRACT

Disclosed herein is a Technological Emergence Scoring and Analysis Platform. The platform provides emergence scores for terms and a set of emergence indicators based on the scores. The platform can be used to quantitatively distinguish scientific and technological emergent topics within a target data category. The platform can take a set of data comprising a plurality of records and calculate an emergence score for terms and phrases representing the terms' or phrases' technological emergence.

23 Claims, 11 Drawing Sheets

(56) References Cited

U.S. PATENT DOCUMENTS

| | | | |
|---|---|---|---|
| 2007/0214133 A1* | 9/2007 | Liberty | G06F 16/3322 |
| 2009/0144609 A1 | 6/2009 | Liang et al. | |
| 2010/0145678 A1 | 6/2010 | Csomai et al. | |
| 2012/0158527 A1* | 6/2012 | Cannelongo | G06Q 30/02 705/14.73 |
| 2016/0292573 A1 | 10/2016 | Babko-Malaya et al. | |

OTHER PUBLICATIONS

European Communication—Extended Search Report dated Apr. 7, 2020 cited in Application No. 17869616.7, 9 pgs.
Olga Babko-Mayala et al., "Characterizing Communities of Practice in Emerging Science and Technology Fields", 2013 International Conference on Social Intelligence and Technology, May 8, 2013, pp. 37-46.

* cited by examiner

Emergence Scores

| # Records | # Instances | Term | Score |
|---|---|---|---|
| 176 | 176 | power conversion | 17.063 |
| 174 | 174 | power conversion efficiency | 11.970 |
| 94 | 94 | organic dye | 9.270 |
| 121 | 121 | electrochemical impedance | 8.495 |
| 107 | 107 | photovoltaic performance | 8.195 |
| 126 | 126 | electron microscopy | 7.707 |
| 88 | 88 | TiO(2) | 7.086 |
| 51 | 51 | extinction coefficient | 6.714 |
| 46 | 46 | TiO(2) film | 6.428 |
| 71 | 71 | density functional theory | 6.196 |
| 54 | 54 | solar cell application | 6.174 |
| 55 | 55 | TiO2 nanotube | 6.16 |
| 149 | 149 | dye sensitized solar cell application | 5.657 |
| 86 | 86 | surface area | 5.542 |
| 149 | 149 | glass substrate | 5.465 |
| 178 | 178 | charge collection | 5.033 |
| 201 | 201 | impedance spectroscopy | 4.969 |
| 65 | 65 | open circuit voltage | 5.030 |
| 74 | 74 | electrochemical impedance spectroscopy | 4.742 |
| 34 | 34 | tin oxide | 4.211 |
| 61 | 61 | molar extinction coefficient | 3.917 |
| 39 | 39 | X-ray diffraction | 3.863 |
| 82 | 82 | nanotube array | 3.829 |
| 22 | 22 | photovoltaic property | 3.727 |
| 22 | 22 | TiO2 nanotube array | 3.686 |
| 31 | 31 | organic sensitizer | 3.685 |
| 198 | 198 | dye N719 | 3.635 |
| 152 | 152 | overall conversion efficiency | 3.61 |
| 49 | 49 | fabricated | 3.58 |
| 27 | 27 | X ray diffraction XRD | 3.59 |
| 80 | 80 | electron microscopy SEM | 3.49 |
| 41 | 41 | electron lifetime | 3.354 |
| 26 | 26 | density functional theory DFT | 3.327 |
| 28 | 28 | microscopy SEM | 3.247 |
| 75 | 75 | short circuit current | 3.221 |
| 75 | 75 | circuit current | 3.221 |

FIG. 3

Normalized vs Total EScores for Leading Countries Publishing on DSSC's

Total EScores for Leading Countries Publishing on DSSCs by Number of Publications

TECHNOLOGICAL EMERGENCE SCORING AND ANALYSIS PLATFORM

CROSS REFERENCE TO RELATED APPLICATIONS

This application claims the benefit of priority to U.S. Provisional Patent Application Ser. No. 62/420,295, filed Nov. 10, 2016, which is hereby incorporated herein by reference in its entirety.

FIELD OF DISCLOSURE

The present disclosure generally relates to identifying emergent technologies, and more specifically to emergence scores and methods for calculating emergence scores for terms related to the technology and a set of emergence indicators based on the emergence scores.

BACKGROUND

Predictors and indicators of technological emergence promise valuable intelligence to those determining research and development (R&D) priorities. This form of intelligence can be used by interested parties to identify emerging technologies (fields) and to contribute to technology assessment processes. However, current assessment methods rely heavily on expert judgment, which can be costly and limited by the perspectives of those consulted and their sharing of tacit knowledge.

Accordingly, there remains a need for new systems and methods of identifying and assessing emergence of technology, and providing emergence indicators using empirical metrics. This need and other needs are satisfied by the various aspects of the present disclosure.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings can contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings can contain text or captions that can explain certain embodiments of the present disclosure. This text is included for illustrative, non-limiting, explanatory purposes of certain embodiments detailed in the present disclosure. In the drawings:

FIG. 3 illustrates a screen shot of a report provided by the Platform in accordance with exemplary embodiments of the present disclosure.

DETAILED DESCRIPTION

Figure 1:
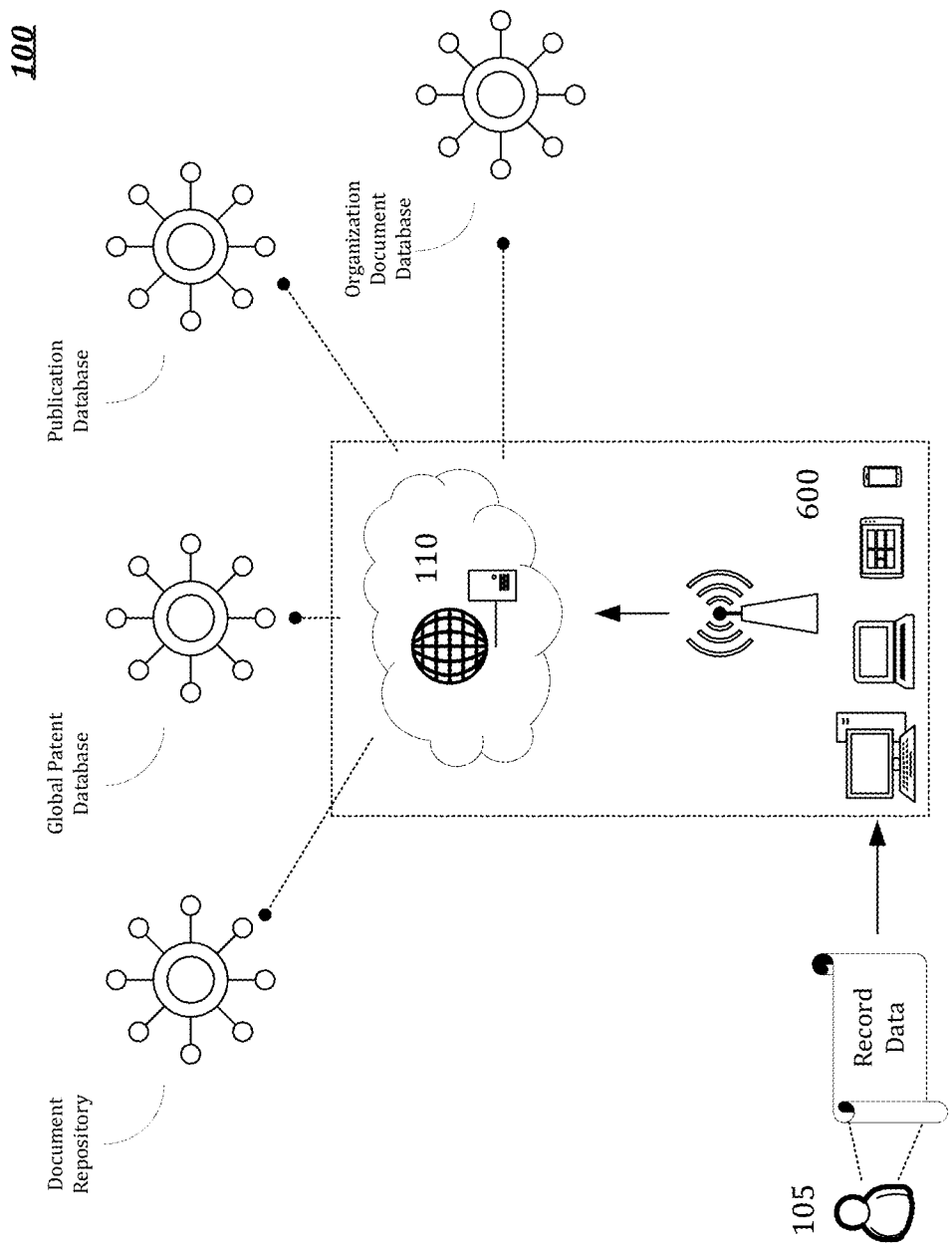
FIG. 1 illustrates a block diagram of an operating environment in accordance with an exemplary embodiment of the present disclosure.

As a preliminary matter, it will readily be understood by one having ordinary skill in the relevant art that the present disclosure has broad utility and application. As should be understood, any embodiment can incorporate only one or a plurality of the above-disclosed aspects of the disclosure and can further incorporate only one or a plurality of the above-disclosed features. Furthermore, any embodiment discussed and identified as being "preferred" is considered to be part of a best mode contemplated for carrying out the embodiments of the present disclosure. Other embodiments also can be discussed for additional illustrative purposes in providing a full and enabling disclosure. As should be understood, any embodiment can incorporate only one or a plurality of the above-disclosed aspects of the display and can further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods can be shown and described as being in a sequence or temporal order, the steps of any such processes or methods are not limited to being carried out in any particular sequence or order, absent an indication otherwise. Indeed, the steps in such processes or methods generally can be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure can be described, modifications, adaptations, and other implementations are possible. For example, substitutions, additions, or modifications can be made to the elements illustrated in the drawings, and the methods described herein can be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure provides various embodiments, features, and aspects that, individually or in various combinations, solve the problems presented by the current state of the art by, for example, but not limited to, providing analytics which, in some embodiments, can enable users to:

Identify emerging technologies by measuring, benchmarking, and/or scoring the emergence attributes of topical terms from records, such as, but not limited to, papers and patent publications, and generate a set of emergence indicators based on the scores. Emergence scoring, as used herein, can be an evidence-based benchmarking and/or forecasting of target technologies.

Contribute to technology assessment processes, such as a Technology Readiness Assessment (TRA), and Competitive Technical Intelligence (CTI), by providing evidence of technological maturity for each technology using numerical scoring as a computer-implemented platform that has not existed before nor could it have without, among other elements, the necessary computer-implemented functions and analytics disclosed herein; and Provide empirical emergence indicators to help determine research and development priorities and guide investment decisions related to target technologies.

A. Platform Overview

Consistent with various embodiments and aspects of the present disclosure, provided herein is a Technological Emergence Scoring and Analysis Platform (hereinafter referred to as the "platform"). This overview is provided to introduce a selection of concepts in a simplified form that are further described below. This overview is not intended to identify key features or essential features of the claimed subject matter. Nor is this overview intended to be used to limit the claimed subject matter's scope.

In various aspects, the platform can be used by individuals or companies (e.g., users, analysts, researchers, etc.) to quantitatively distinguish scientific and technological emergent topics within a target data category. In further aspects, the platform can take a set of data comprising a plurality of records and calculate an emergence score (an "EScore" or "ESc") for terms and phrases representing the terms' or phrases' technological emergence or a measure of the terms' emergence attributes. This platform provides emergence scores for terms and a set of emergence indicators based on them to distinguish: papers (or patents) rich in emergent topic coverage; leading edge research organizations, countries, or individuals based on their engagement of emerging technology content; and fields that are relatively more emergent. Thus, the platform can allow individuals and companies to make better decisions when it comes to deciding which research fields to pursue, deciding which programs to support, choosing where resources should be allocated, or selecting which technologies to invest in.

In an exemplary aspect, the present disclosure provides a method for scoring emergence of a term. The methods can comprise: accessing, by a system having at least one processor, a data set comprising a plurality of records having textual information, the plurality of records being from a predefined time interval having a base period and an active period; determining, by the system, from the data set, a set of terms meeting predetermined criteria; determining, by the system, at least one relative component value for each term for at least one of a portion of the predefined time interval; determining, by the system, a numeric score for each term based on the relative component value; and classifying, by the system, each term meeting a minimum numeric score as an emergent term; wherein the method is configured to provide analysis and predictive information related to the emergent term. The method can further comprise generating, by the system, at least one indicator for a set of records sharing at least one feature.

In another exemplary aspect, the present disclosure also provides computer-readable non-transitory storage medium comprising a set of instructions which when executed perform a disclosed method.

In another exemplary aspect, the present disclosure also provides devices and systems configured to execute one or more steps of the disclosed methods.

Both the foregoing overview and the following detailed description provide examples and are explanatory only. Accordingly, the foregoing overview and the following detailed description should not be considered to be restrictive. Further, features or variations can be provided in addition to those set forth herein. For example, embodiments can be directed to various feature combinations and subcombinations described in the detailed description.

B. Platform Configuration

In one aspect, FIG. 1 illustrates one possible operating environment through which a platform in accordance with exemplary embodiments of the present disclosure can be provided. In further aspects, and by way of non-limiting example, a platform 100 can be hosted on a centralized server 110, such as, for example, a cloud computing service. A user 105 can access platform 100 through a software application. The software application can be embodied as, for example, but not be limited to, a website, a web application, a desktop application, and a mobile application compatible with a computing device 600. In some aspects, an exemplary embodiment of the software application can be provided by the VantagePoint™ suite of products and services provided by Search Technology Inc.

In further aspects, the platform can comprise of a plurality of databases. In yet further aspects, the database can comprise a document repository, or data superset, or a combination thereof. In still further aspects, the platform can comprise at least one data set received from the database. In even further aspects, the data set can comprise a plurality of records. In yet further aspects, the records can comprise a plurality of documents. In still further aspects, the documents can comprise journal articles, research publications, patent publications, or a combination thereof. In some aspects, the records can comprise text, or metadata, or a combination thereof. In other aspects, the records can relate to a category, topic, organization, or publication type, or a combination thereof. For example, and without limitation, the data set could be topical (e.g., resulting from a search on, "graphene"), could be organizational (e.g., a search for authored papers from a specific university), or universal for a given data source (e.g., all European Patent Office (EPO) patents over a 15-year period).

In various aspects, the data set comprises records from a predetermined period of time. In further aspects, the period of time can comprise at least 1 year, for example, and without limitation, 2, 3, 4, 5, 6, 7, 8, 9, 10, or more years. In still further aspects, the period of time can be a current time period or a period of time in the past. In yet further aspects, the period can comprise a base period and an active period. In some aspects, the period can comprise partial year data. In other aspects, the period does not comprise partial year data.

In further aspects, the data set can comprise field-structured records or semi-structured records, or a combination thereof. In still further aspects, the data set can comprise semi-structured data in the form of a time indicator and descriptive text. In some aspects, the data set can comprise one or more data parameters selected from: terms to analyze for emergence; time indicators—i.e., time periods, including, but not limited to years; source information—(e.g., such as organization, country, person, topical domain); and location information—(e.g., country or other geographical location or other forms of "location" such as disciplinary category or patent class).

In further aspects, the platform can analyze the data to identify one or more sets of candidate terms. In further aspects, analyzing the data set to identify a set of candidate terms can comprise extracting all n-grams up to a predetermined length, for example, unigrams and multiword phrases. In still further aspects, the candidate term set can comprise various forms of keywords, or index terms, or the like.

In further aspects, the candidate term set can comprise abstract phrases, or title phrases, or a combination thereof. In still further aspects, the candidate term sets can be extracted using Natural Language Processing (NLP). In some aspects, the candidate term sets can be NLP extracted single words (e.g., unigrams). In other aspects, the candidate term set can comprise topic or concept lists extracted from text, for example, using topic modeling or other concept extraction techniques and methods.

In various aspects, the platform can comprise reducing the size of the candidate term set by applying at least one filter. In further aspects, the at least one filter can comprise a variety of cleaning and consolidation routines. In still further aspects, the cleaning and consolidation routines can comprise application of thesauri, fuzzy matching algorithms, grouping, or manual cleaning, or a combination thereof.

In various aspects, the platform further comprises selecting a specified number of candidate terms to be retained as candidate emergent terms. In further aspects, the selected candidate emergent terms can be retained if the terms meet predetermined criteria. In still further aspects, the criteria can comprise at least one of: appearance in a minimum number of records; appearance in records from a minimum number of years; ratio of records containing the term in the active period to those in the base period of at least 2:1; the term failed to appear in more than a maximum percentage of the base period records; the terms have more than one author that don't share the same record set; or a combination thereof. In an exemplary embodiment, the criteria for retaining a term can comprise one or more of the following: Appear in at least 7 records; Appear in records from at least 3 years; The ratio of records containing the term in the active period to those in the base period was at least 2:1; The term did not appear in 15% or more of the base period records; Terms are also required to have more than one author that don't share the same record set; Unigrams require double the scores as multiword phrases to qualify for the Emergent Term group. In the case of the Emergence Score, the final score is divided by 2 for unigrams.

In various aspects, the platform comprises assigning a numerical emergence score ("EScore") for each candidate and/or emergent term. In further aspects, the EScore can be generated by defining a base period and tracking term activity over successive years in a given data set. In still further aspects, the platform can utilize trend analyses of time series data to determine and assign an EScore for each emergent term. In yet further aspects, generating EScores can comprise weighing term frequency over time and growth patterns.

In further aspects, the platform can calculate various numerical component values that can be used to formulate EScores. In still further aspects, assigning a numeric EScore can further comprise calculating a numerical component value for at least one trend analysis for each emergent term and applying a predetermined weight to each numeric value to calculate each EScore. In yet further aspects, the component values can comprise trend analysis values based on an active period; trend values reflecting recent trending; or trend values based on an early active period; or combinations thereof. In even further aspects, the component values can comprise: a last period slope divided by a first period slope for an active period; comparing the change from the most recent period to a prior period; slope from the mid-year of the active period to the most recent year; or slope from first point to mid-point; or combinations thereof. In some aspects, the EScores are calculated by weighting emergent term instances in the data set. In other aspects, EScores are calculated by counting each different term appearing in a record, ignoring multiplicity of instances within records.

In further aspects, the platform can generate various scoring options, weighting whichever trend or component value one desires in calculating various scores. In still further aspects, the platform enables one to score an organization (or nation or author) variously too. By way of a non-limiting example, if an organization having 30 publications or patents in the dataset is being analyzed, the platform can calculate their mean EScore. Alternatively, the platform can use their sum (or average or count or percentage) of those 30 records exceeding some predetermined threshold.

In an exemplary embodiment, Emergence scoring can comprise an additive model, counting one or more component trend values, selected from: Last 3-year slope divided by the first 3-year slope for the active period (double-weighted); Recent Trend—comparing the change from the most recent 2 years to the 2 years prior; Slope from the mid-year of the active period to the most recent year (for example, Year 7 to Year 10) [presuming a 3-year base period followed by a 7-year active period]; and Slope from first point to mid-point;

In further aspects, the platform can further comprise a procedure for normalizing EScores. In still further aspects, the normalizing procedure can comprise normalizing the EScore of a given record based on its length in terms, counting the subset of terms that meet the criteria for consideration as possibly emergent, normalization based on counting all phrases appearing in a given record as the normalization factor (the denominator); or subtracting the mean EScore for a term set in question from each value, and dividing that by the sample standard deviation; or a combination thereof. In some aspects, EScores can comprise term-based scoring. In other aspects, EScores can comprise record-based scoring.

In various aspects, the platform can use the emergence scores to generate at least one emergence indicator to distinguish a given data feature. In further aspects, the platform can use emergent terms meeting a minimum score to generate at least one indicator from records containing at least one emergent term and at least one feature of said records. In still further aspects, the at least one feature can comprise organizations, component technologies, authors, countries, location, technical domain, research paper or patent publication, or a combination thereof. In still further aspects, the at least one indicator can utilize term-based metrics or record-based metrics, or a combination thereof.

In further aspects, record-based metrics used to generate emergence indicators can comprise: number of an organization's records containing one or more high EScore terms; percentage of those records containing one or more high EScore terms; an average EScore for an organization's records, with variations including scoring all terms, or all qualifying terms, or just terms above threshold; concentration of records (i.e., percentage or the like) scoring above some record-level emergence score threshold (i.e., sum of EScore for each record) and determining organizations whose emergent activity is particularly prevalent; or tally of term EScores for all records, and then setting a cutoff and separating out organizations that have generated a predetermined number of those records; or a combination thereof.

In still further aspects, term-based metrics used to generate emergence indicators can comprise: summation of term-based EScores using various thresholds; counts of term-based EScores using various thresholds [i.e., tallying the number of terms used in all an organization's records that had a value above threshold]; average EScores per qualifying term used by that organization (using various thresholds); summations and averages using the natural logarithm of the EScores; or summations and averages using the square root of the EScores; or a combination thereof. In some aspects, an emergence indicator can be the summation of SQRT (EScores) above a chosen threshold, counting each time a term was used in a distinct record; but not crediting multiple occurrences within a record ("Total EScore"). In other aspects, an emergence indicator can be the summation of SQRT (EScores) above a chosen threshold, counting each time a term was used in a distinct record, divided by the SQRT of the number of records ("Normalized Total EScores").

The platform can be accessed by, for example, a network of employees, a network of analysts, a network of other potential users, and a database management network. Upon access, each user can input and retrieve data from the platform. Read and write access can be granted or restricted, depending on the status of each user. As will be detailed with reference to FIG. 6 below, the computing device through which the platform can be accessed can comprise, but not be limited to, for example, a desktop computer, laptop, a tablet, or mobile telecommunications device.

C. Platform Operation

According to various aspects of the present disclosure, provided herein are methods and systems for calculating emergence scores for terms and generating a set of emergence indicators based on the scores (collectively referred to as the "platform"). In further aspects, the platform can be comprised of various methods and systems implemented by a computing device. As will be detailed below with respect to FIG. 6, the computing device (e.g., computing device 600) can comprise various computing modules having software instructions for performing and operating at least a portion of the various methods and systems of the platform.

In still further aspects, the platform can allow users to identify and score emergent terms within a given data set. As such, users can generate emergence indicators to assess and differentiate features of the data set, such as, for example organizations, countries, or authors, by using the scores to determine activity level of the feature in a target data set or field. The platform can also identify records rich in emergent technology content, and score technological fields on relative degree of emergence.

Figure 2:
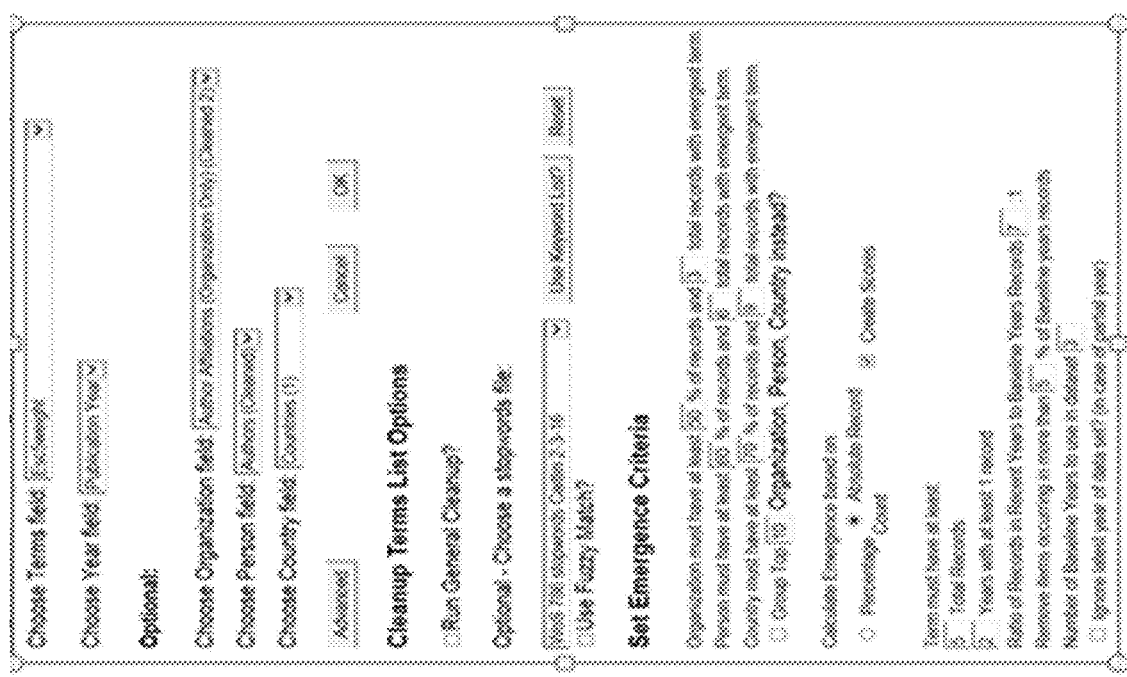
FIG. 2 illustrates a screen shot of a user interface for the Technical Emergence Scoring Platform (the "Platform") in accordance with exemplary embodiments of the present disclosure.

In one aspect, FIG. 2 illustrates an exemplary embodiment of an initial user interface (UI) that can be provided by the platform. The initial UI can be used as an interface for the platform to gather initial criteria and attributes of candidate terms for determining emergence scores and emergence indicators in a data set. The UI can comprise various input fields and buttons to enable the user to provide data and make choices to guide underlying calculations and/or generation of EScores. For example, the UI allows variation for the time period, where the user can provide some number of years (or other temporal units) of data as the "Year field" and can change the "Number of Baseline Years", as well as the option to ignore data from the latest year (e.g., with partial data years).

In some embodiments, the platform can create, import, store, and/or export the data in a spreadsheet. In various embodiments, data can be submitted, stored, accessed and viewed using the platform. These data can also be used by the platform in performing "Emergence Score" calculations, as described herein, the results of which can be used to generate emergence indicators to distinguish data features, for example, documents rich in emergent topic coverage; leading edge research organizations, countries, or individuals based on their engagement of emerging technology content; or fields that are relatively more emergent; or a combination thereof.

Still consistent with embodiments of the present disclosure, the platform can generate reports showing the emergent terms and score for each emergent term. FIG. 3 illustrates an embodiment of such a report. The report can include a table with columns representing the emergent terms, number of records, number of term instances, and EScores, that serves as the platform's assessment of emergence for a term.

Figure 6:
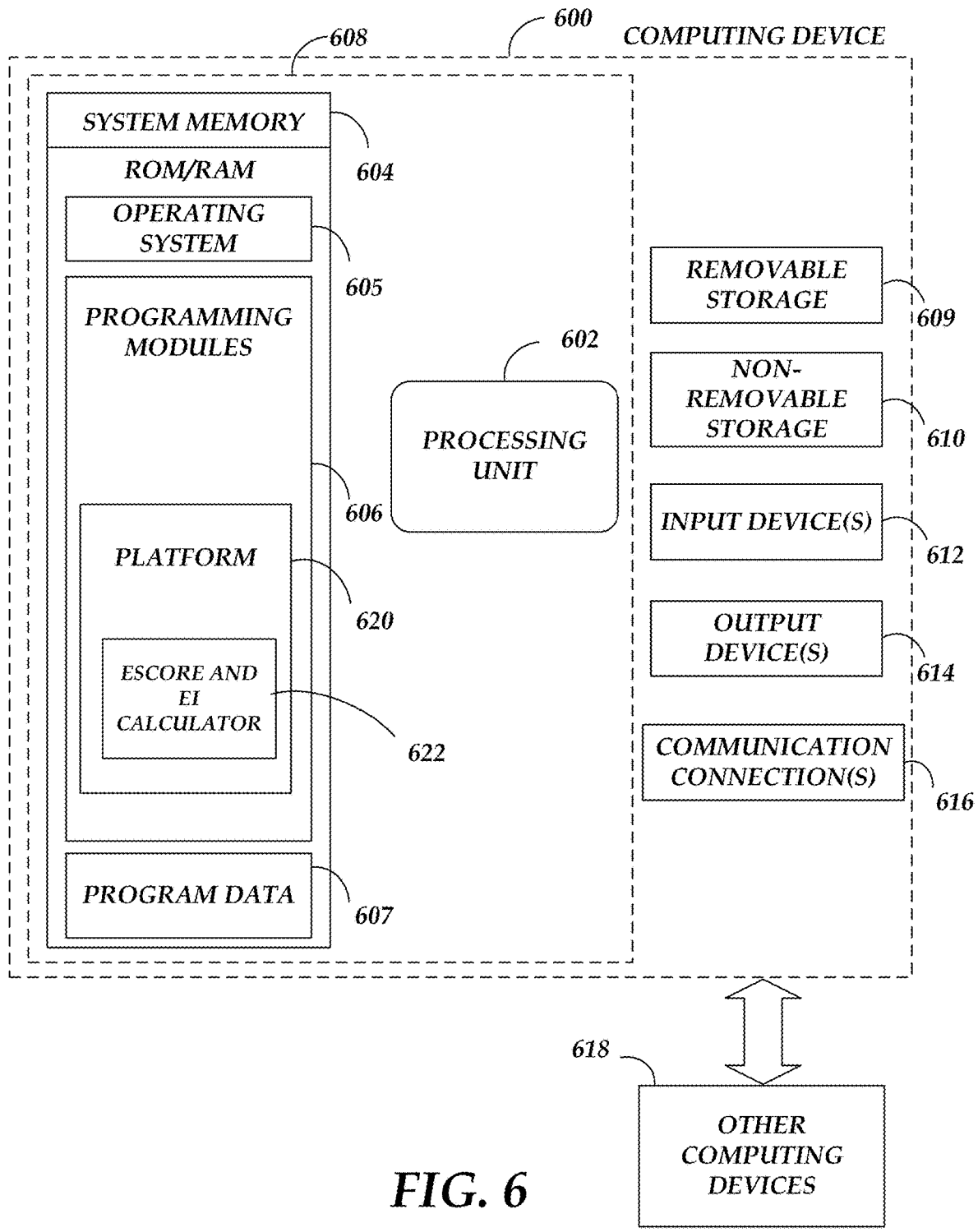
FIG. 6 illustrates a block diagram of a computing device consistent with exemplary embodiments of the present disclosure.

Consistent with embodiments of the disclosure, the platform can include an Emergence Score and Emergence Indicator calculator. The EScore Calculator 622 (FIG. 6) can be enabled to calculate a score known as the "Emergence Score" (aka, "EScore") for a given term or phrase. In various aspects, the EScore is a calculated score for terms and phrases representing the degree of particular terms or phrases' technological emergence. The EScore can be used to anticipate, for example, and without limitation, research activity. As illustrated in FIG. 6, the EScore and EI calculator 622 can be a module contained within the platform 620. In other embodiments, the EScore and EI calculator 622 module can be independent of the platform 620.

Figure 4:
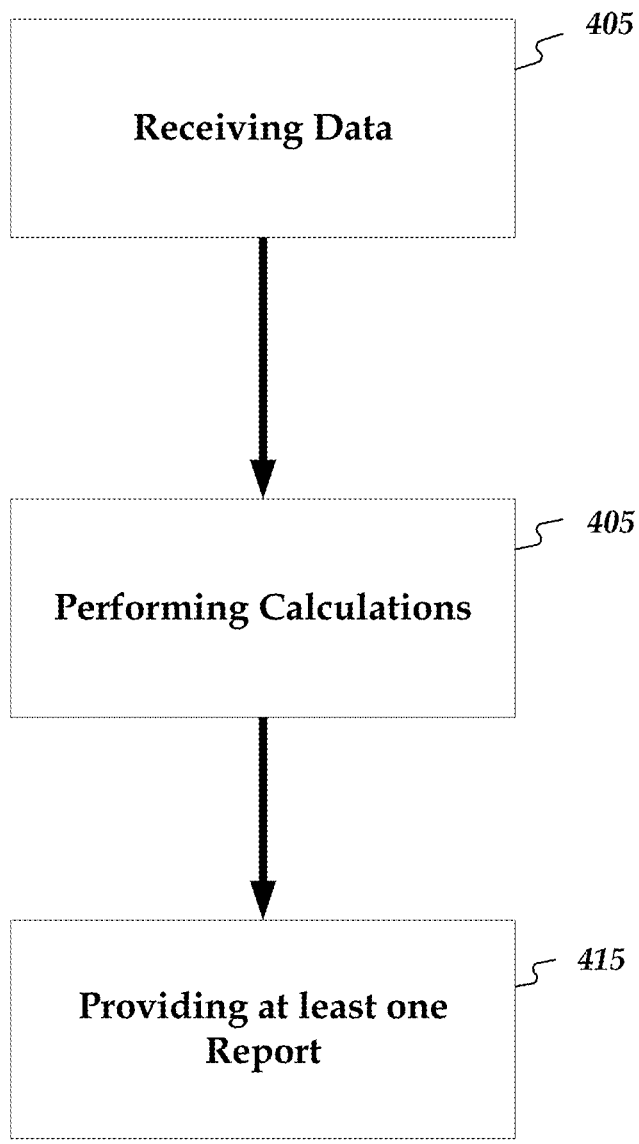
FIG. 4 illustrates a flow chart of a method for providing an exemplary embodiment of the Platform in accordance with the present disclosure.

FIG. 4 is a flow chart setting forth the general stages involved in a method 400. Method 400 can be performed by EScore and EI Calculator 622. Method 400 can be implemented using a computing device 600 as described in more detail below with respect to FIG. 6.

Although method 400 has been described to be performed by computing device 600, it should be understood that, in some embodiments, different operations can be performed by different networked elements in operative communication with computing device 600. For example, server 110 and/or computing device 600 can be employed in the performance of some or all of the stages in method 400. Moreover, server 110 can be configured much like computing device 600 and, in some instances, be one in the same embodiment.

Method 400 can begin at stage 405, wherein data sets or data comprising a plurality of records can be received. The data can be received as, for example, a file accessible by computing device 600. As described above, the data can be received from a database or document repository. The data can be provided through a user interface, such as the user interface illustrated in FIG. 2. Alternatively, the user interface can have a section through which a file (e.g. a spreadsheet) can be uploaded.

Once computing device 600 receives the data input in stage 405, method 400 can continue to stage 410 where computing device 600 can perform calculations and data transformation involving the input data. These calculations can result in providing various disclosed metrics of interest, which can represent scoring, aspects and indicators of emergence.

Figure 7:
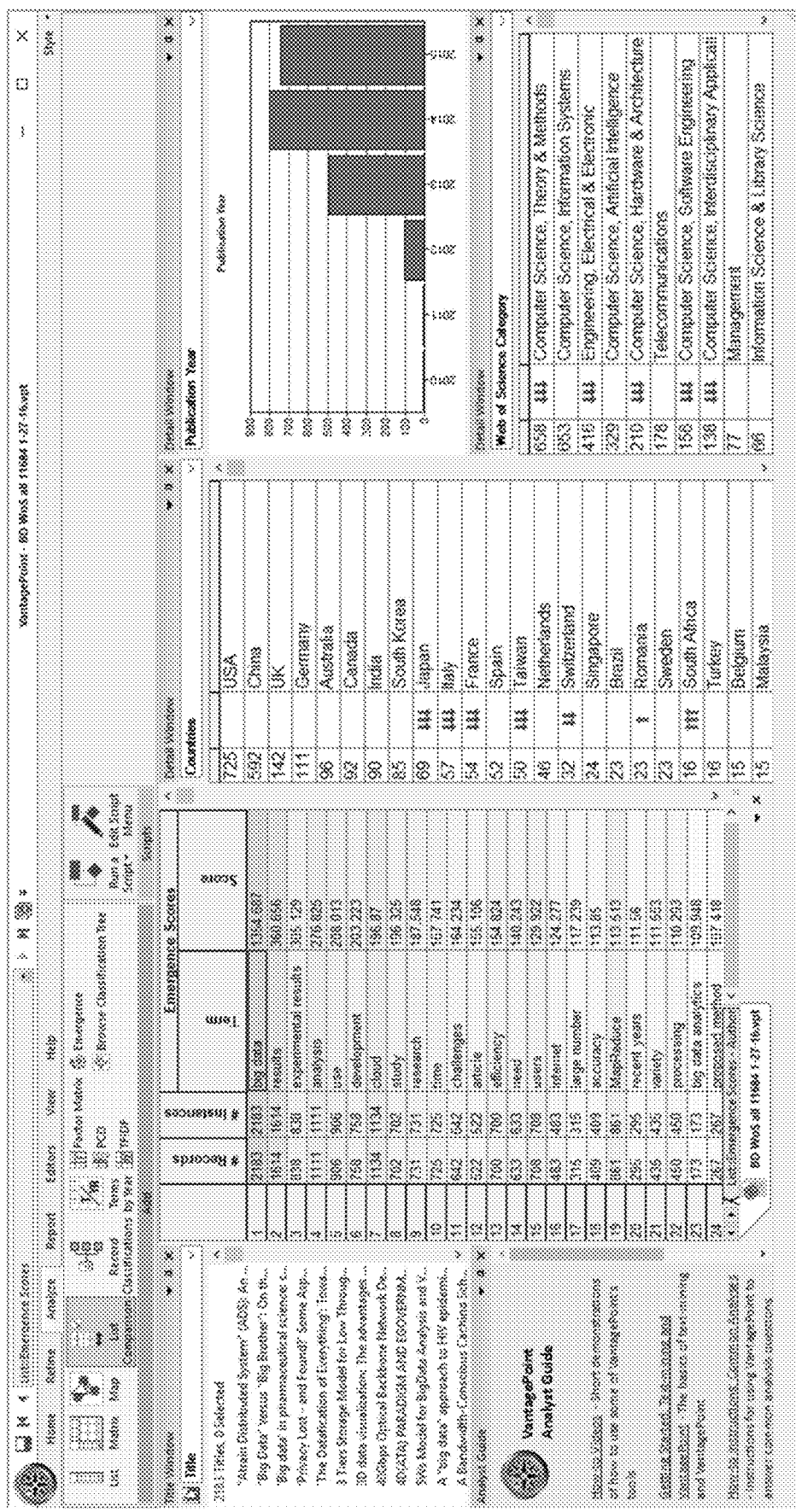
FIG. 7 illustrates a screen shot of an operating environment reporting Emergence Score ("EScore") values on terms in accordance with exemplary embodiments of the present disclosure.
Figure 8:
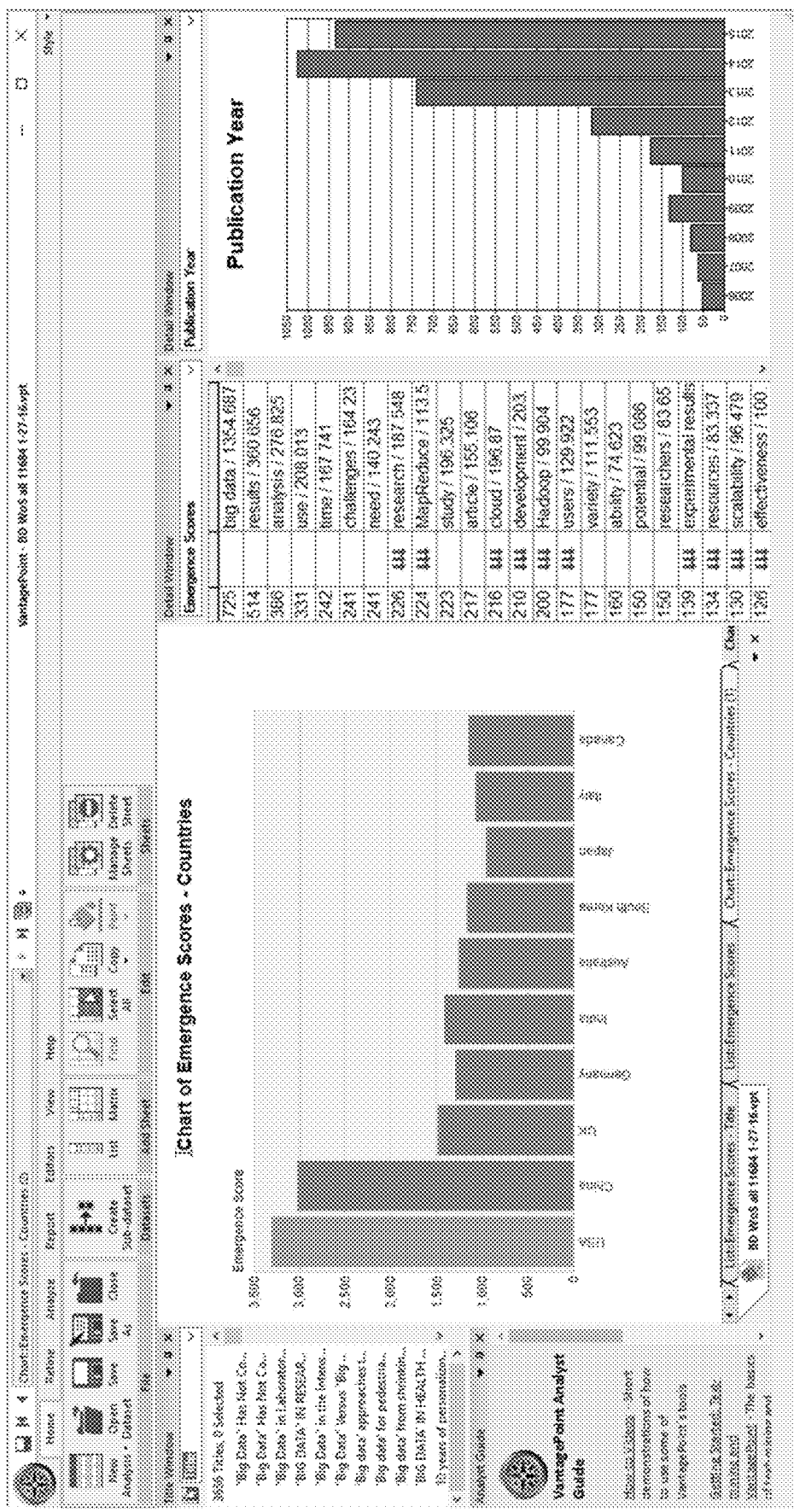
FIG. 8 illustrates a screen shot of an operating environment reporting a visualization of Emergence Score values on countries in accordance with exemplary embodiments of the present disclosure.

Once computing device 600 has made the calculations of stage 410, method 400 can continue to stage 415 where computing device 600 can provide report of the results of the EScore and/or emergence indicator calculations. In various aspects, a dashboard may be provided to report the results or display various visual representations of the results. In further aspects, a standard set of views and templates may be used to report emergence scores, indicators and/or the associated data. For example, as shown in FIGS. 7 and 8, emergence scores, indicators and/or resultant metrics can be displayed in the form of charts and graphs. In still further aspects, the dashboard may allow users to set configuration properties to customize the reports, views, graphs, charts, emergence score and/or indicator aggregation. In yet further aspects, these configurations may include, for example, an indicator identifier, a feature identifier, data grouping, single or multiple, aggregate function, sum or average, default and customizable axis's and labels. The dashboard may also include the ability to define guards or baselines, which may be used to provide visual cues on the charts and for alarms or notifications.

According to various aspects, the benefits of the platform can provide many advantages for many different industries and applications. Applications of the intelligence generated via the family of emergence scores and indicators can at least benefit and be utilized in: research and development (R&D) evaluation efforts; homeland security technology monitoring; and investor (private equity) determination of best technology opportunities.

In various further aspects, the platform can help identify emerging technologies in many fields. In still further aspects, the platform can be used in various technology assessment processes. For example, a Technology Readiness Assessment (TRA) is a systematic, metrics-based process that assesses the maturity of, and the risk associated with, critical technologies to be used in Major Defense Acquisition Programs. TRA integrates information to gauge the maturity of a technology and its likelihood of being operational to contribute to programs under development—i.e., to help forecast its development. It addresses Technology Readiness Levels to benchmark the target technology's status and prospects.

As described herein, the inventive devices, systems, and methods of the present platform can draw upon multiple trend components, and can be formulated to position target technologies on a growth curve. For emerging technologies, and without wishing to be bound by a particular theory, the most prominent growth models are understood to be various logistic ("S-shape") curves. In further aspects, exponential growth is found, for certain technologies, for certain temporal periods. To this end, the platform can be utilized to locate target technologies on growth curves for various levels, which include, but are not limited to, component technologies within a technological field (domain) being assessed (e.g., within Nano Enabled Drug Delivery (NEDD)); technological fields per se, for example, to compare against other technological fields (e.g., NEDD vs. graphene);

According to further aspects, various information generated using the platform can be used for or incorporated in Competitive Technical Intelligence (CTI) related applications. By way of non-limiting example, the platform can perform portfolio analysis of a target organization (e.g., a company of interest). In various aspects, the procedure performed by the platform can comprise one or more of the following: performing a search for patents by the organization (e.g., using a global patent database); downloading the patents by the organization; grouping the patents into categories; determining emergence scores for relevant terms for relevant technologies meeting a predetermined criteria; associating the scores with one or more elements of the patents and/or organization; constructing a searchable database comprising the patents and scores (e.g., in the form of a spreadsheet, or the like). In various aspects, the searchable database can provide a rich set of quick results for an analyst to pursue select elements of high value.

According to further aspects, additional applications and tools of the platform can comprise generating searchable databases (e.g. workbooks) comprising emergence scores of target technologies. In further aspects, the searchable databases can be based on and developed for technology-focused patent searches; organizations; and for technologies based on R&D publication search datasets. In various aspects, these tools can inform comparison of disparate technologies.

In further aspects, providing emergence scores and evidence of technological maturity for each technology using numerical scoring allows for additional comparative analysis applications using the scores. For example, and without limitation, private equity decision-making can benefit from the platform by using the empirical indicators to help determine more vs. less attractive investments.

In further aspects, the disclosed applications and tools utilizing EScoring can be used in other analyses, such as, and without limitation, in technology assessment. To this end, technology assessment relies heavily on expert judgment, which is costly and limited by the perspectives of those consulted and their willingness & ability to share tacit knowledge. Empirical metrics and emergence indicators provided by the platform can be used for a TRA to provide factual, verifiable data.

In still further aspects, the platform can be utilized in combination with additional information pieces. For example, criteria for important frontier contributions—papers, organizations, countries, or authors—can be enriched with citation data. For example, using resources such as Web of Science (WoS), citation information on research papers (and/or patent citation information) can be readily obtained and incorporated into the platform. In further aspects, cited papers or patents can provide a complementary dimension to augment emergence scoring. In still further aspects, this approach can enable rapid profiling of an S&T topical arena on demand. In yet further aspects, a search algorithm can be developed to download abstract records from one or more suitable databases, thereby allowing generation of this set of emergence indicators in minutes. In even further aspects, parameters can be standardized to facilitate user familiarity to boost understanding of what the indicators mean. In other aspects, the platform can provide flexibility to adjust parameter settings to discern special sensitivities (e.g., for intelligence interests).

In further aspects, the use of such R&D emergence indicators can be used in conjunction with tabulations of publication and citation activity. For example, the platform can be used to provide a research landscaping service on behalf of researchers developing proposals. In still further aspects, such assessment of current research activities is required to gain support of many project proposals. In yet further aspects, locating proposed research with respect to the empirically determined emergent topics within a domain helps make one's case for support. In even further aspects, the platform can be used to demonstrate strong organizational positioning, or show how other national or organizational competitors stand.

Figure 5:
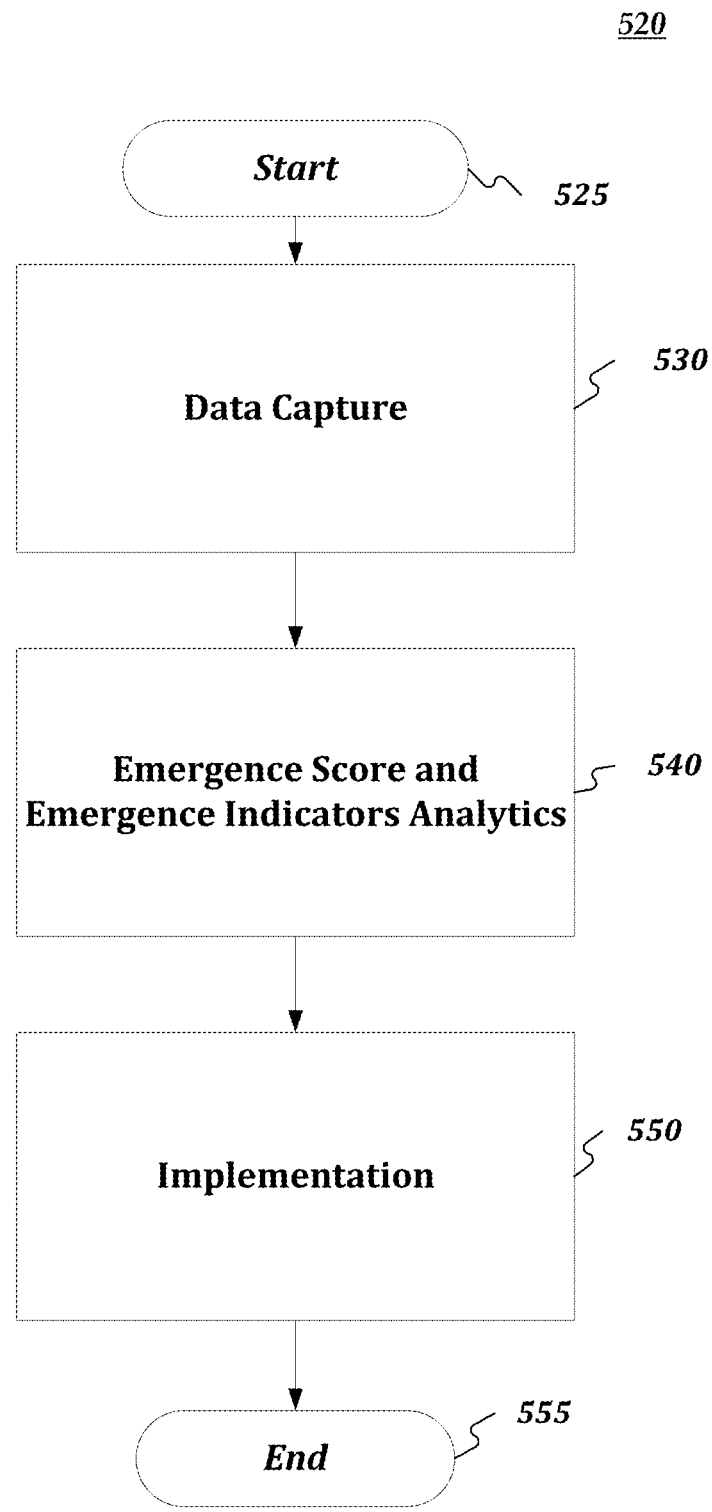
FIG. 5 illustrates a flow chart of a method for providing an exemplary embodiment of the Platform in accordance with the present disclosure.

FIG. 5 is a flow chart setting forth the general stages involved in a method 520 consistent with an embodiment of the disclosure for providing the platform 100. Method 520 can be implemented using a computing device 600 as described in more detail below with respect to FIG. 6.

Although method 520 has been described to be performed by platform 100, it should be understood that computing device 600 can be used to perform the various stages of method 520. Furthermore, in some embodiments, different operations can be performed by different networked elements in operative communication with computing device 600. For example, server 110 can be employed in the performance of some or all of the stages in method 520. Moreover, server 110 can be configured much like computing device 600.

Although the stages illustrated by the flow charts are disclosed in a particular order, it should be understood that the order is disclosed for illustrative purposes only. Stages can be combined, separated, reordered, and various intermediary stages can exist. Accordingly, it should be understood that the various stages illustrated within the flow chart can be, in various embodiments, performed in arrangements that differ from the ones illustrated. Moreover, various stages can be added or removed from the flow charts without altering or deterring from the fundamental scope of the depicted methods and systems disclosed herein. Ways to implement the stages of method 400 will be described in greater detail below.

Method 520 can begin at starting block 525 and proceed to stage 530 where platform 100 can capture data that is to be inputted into a database associated with platform 100. Inputting can comprise the stages of importing and mapping the data by accessing various sources, for example, a document repository or database.

Consistent with the embodiments of the present disclosure, platform 100 can be configured to normalize and consolidate data from multiple sources and disparate formats. Platform 100 can be configured to communicate with the various data sources via, for example, an application programming interface integration between platform 100 and the data source. In this way, data integration can be at least in part computer-implemented.

From stage 530, platform 100 can advance to stage 540 where emergence score and/or indicator analytics can be performed. Referring back to Method 500, various reports can be provided through a user interface of platform 100.

Method 520 can continue to stage 550 where platform 100 can enter into an implementation mode. For example, platform 100 can facilitate providing the emergence score and/or indicator data to a competitive technical analyst serving R&D management; mergers & acquisitions; or product development. For example, the platform 100 may facilitate delivery of target results to support such an analyst by processing the inputted day and presenting: an early warning on component technologies within a domain that warrant attention as "emerging"; high priority research papers or patents within that domain to read [based on emergent records]; key organizations active at the frontier of R&D in the domain to monitor as high priority (potential collaborators or competitors); countries to track; cutting-edge authors; and/or relative R&D activity level of different technical domains (emergent fields).

D. Platform Architecture

The platform 620 and emergence score and indicator calculator 622 can be embodied as, for example, but not be limited to, a website, a web application, a desktop application, and a mobile application compatible with a computing device. The computing device can comprise, but not be limited to, a desktop computer, laptop, a tablet, or mobile telecommunications device. Moreover, the platform 620 and EScore and EI Calculator can be hosted on a centralized server, such as, for example, a cloud computing service.

FIG. 6 is a block diagram of a system including computing device 600. Consistent with an embodiment of the disclosure, the aforementioned memory storage and processing unit can be implemented in a computing device, such as computing device 600 of FIG. 6. Any suitable combination of hardware, software, or firmware can be used to implement the memory storage and processing unit. For example, the memory storage and processing unit can be implemented with computing device 600 or any of other computing devices 618, in combination with computing device 600. The aforementioned system, device, and processors are examples and other systems, devices, and processors can comprise the aforementioned memory storage and processing unit, consistent with embodiments of the invention. Furthermore, computing device 600 can comprise an operating environment for method 500 as described above. Method 500 can operate in other environments and is not limited to computing device 600.

With reference to FIG. 6 a system consistent with an embodiment of the disclosure can include a computing device, such as computing device 600. In a basic configuration, computing device 600 can include at least one processing unit 602 and a system memory 604. Depending on the configuration and type of computing device, system memory 604 can comprise, but is not limited to, volatile (e.g. random access memory (RAM)), non-volatile (e.g. read-only memory (ROM)), flash memory, or any combination. System memory 604 can include operating system 605, one or more programming modules 606, and can include a program data 607. Operating system 605, for example, can be suitable for controlling computing device 600's operation. In one embodiment, programming modules 606 can include Platform 620 and EScore Calculator 622. Furthermore, embodiments of the disclosure can be practiced in conjunction with a graphics library, other operating systems, or any other application program and is not limited to any particular application or system. This basic configuration is illustrated in FIG. 6 by those components within a dashed line 608.

Computing device 600 can have additional features or functionality. For example, computing device 600 can also include additional data storage devices (removable and/or non-removable) such as, for example, magnetic disks, optical disks, or tape. Such additional storage is illustrated in FIG. 6 by a removable storage 609 and a non-removable storage 610. Computer storage media can include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media can include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media can be part of device 200. Computing device 600 can also have input device(s) 612 such as a keyboard, a mouse, a pen, a sound input device, a touch input device, etc. Output device(s) 614 such as a display, speakers, a printer, etc. can also be included. The aforementioned devices are examples and others can be used.

Computing device 600 can also contain a communication connection 65 that can allow device 600 to communicate with other computing devices 618, such as over a network in a distributed computing environment, for example, an intranet or the Internet. Communication connection 65 is one example of communication media. Communication media can typically be embodied by computer readable instructions, data structures, program modules, or other data in a modulated data signal, such as a carrier wave or other transport mechanism, and include any information delivery media. The term "modulated data signal" can describe a signal that has one or more characteristics set or changed in such a manner as to encode information in the signal. By way of example, and not limitation, communication media can include wired media such as a wired network or direct-wired connection, and wireless media such as acoustic, radio frequency (RF), infrared, and other wireless media. The term computer readable media as used herein can include both storage media and communication media.

As stated above, a number of program modules and data files can be stored in system memory 604, including operating system 605. While executing on processing unit 602, programming modules 606 (e.g., application 620, EScore Calculator 622) can perform processes including, for example, one or more method 600's stages as described above. The aforementioned process is an example, and processing unit 602 can perform other processes. Other programming modules that can be used in accordance with embodiments of the present disclosure can include electronic mail and contacts applications, word processing applications, spreadsheet applications, database applications, slide presentation applications, drawing or computer-aided application programs, etc.

Generally, consistent with embodiments of the disclosure, program modules can include routines, programs, components, data structures, and other types of structures that can perform particular tasks or that can implement particular abstract data types. Moreover, embodiments of the disclosure can be practiced with other computer system configurations, including hand-held devices, multiprocessor systems, microprocessor-based or programmable consumer electronics, minicomputers, mainframe computers, and the like. Embodiments of the disclosure can also be practiced in distributed computing environments where tasks are performed by remote processing devices that are linked through a communications network. In a distributed computing environment, program modules can be located in both local and remote memory storage devices.

Furthermore, embodiments of the disclosure can be practiced in an electrical circuit comprising discrete electronic elements, packaged or integrated electronic chips containing logic gates, a circuit utilizing a microprocessor, or on a single chip containing electronic elements or microprocessors. Embodiments of the disclosure can also be practiced using other technologies capable of performing logical operations such as, for example, AND, OR, and NOT, including but not limited to mechanical, optical, fluidic, and quantum technologies. In addition, embodiments of the disclosure can be practiced within a general purpose computer or in any other circuits or systems.

Embodiments of the disclosure, for example, can be implemented as a computer process (method), a computing system, or as an article of manufacture, such as a computer program product or computer readable media. The computer program product can be a computer storage media readable by a computer system and encoding a computer program of instructions for executing a computer process. The computer program product can also be a propagated signal on a carrier readable by a computing system and encoding a computer program of instructions for executing a computer process. Accordingly, the present disclosure can be embodied in hardware and/or in software (including firmware, resident software, micro-code, etc.). In other words, embodiments of the present disclosure can take the form of a computer program product on a computer-usable or computer-readable storage medium having computer-usable or computer-readable program code embodied in the medium for use by or in connection with an instruction execution system. A computer-usable or computer-readable medium can be any medium that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific computer-readable medium examples (a non-exhaustive list), the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks can occur out of the order as shown in any flowchart. For example, two blocks shown in succession can in fact be executed substantially concurrently or the blocks can sometimes be executed in the reverse order, depending upon the functionality/acts involved.

While certain embodiments of the disclosure have been described, other embodiments can exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages can be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with the granted patent and for no other purpose.

E. Embodiments and Examples

The following embodiments and examples are put forth so as to provide those of ordinary skill in the art with a complete disclosure and description of how the platform, systems, devices and/or methods claimed herein can be used and can be evaluated, and are intended to be purely exemplary and are not intended to limit the disclosure. Efforts have been made to ensure accuracy with respect to numbers (e.g., record counts, etc.), but some errors and deviations should be accounted for.

There are numerous variations and combinations of conditions and components that can be used to optimize the described exemplary examples. Only routine experimentation, if any, will be required to optimize such conditions and components. Several systems and methods for determining emergence of a term in accordance with the invention are illustrated in the following examples.

In various aspects, a number of data sets comprising a plurality of records were retrieved from different databases. The data sets were then analyzed and processed using an Emergence Indicator (EI) script comprising instructions which when executed, for example by a computing device, perform various steps of the inventive method.

The six data sets were related to four different technological fields, and included the following: (1) Big Data comprising publication abstract records from the Web of Science™ ("WoS"), (2) Non-Linear Programming ("Non-Linear") from WoS, (3) Dye Sensitized Solar Cells ("DSSCs") comprising publication abstract records from WoS, (4) DSSCs comprising patent family abstract records from the PatStat database, (5) Nano-Enabled Drug Delivery ("NEDD") comprising publication abstract records from the MEDLINE database, and (6) NEDD comprising articles from WoS. In some aspects, a potentially relevant characteristic or attribute of a data set being analyzed can be its growth rate. In further aspects, the listed datasets can provide a rapidly growing science/technology (NEDD), two rapidly growing technologies (DSSCs and Big Data), and a relatively slow-growing, applied mathematics research area (Non-Linear Programming) Additional details regarding the data sets are provided in Table 1.

TABLE 1

| | | Data sets | | | |
|---|---|---|---|---|---|
| Dataset | Source | 10-Year Test Period | Full Period Available | Test Period # of Records | Total # of Records |
| Big Data (BD) | WoS | 2004-2013 | 2003-205 (partial year) | 5992 | 13349 |
| Non-Linear Programming (Non-Linear) | WoS | 2003-2012 | 2003-2015 | 2260 | 3225 |
| DSSCs | WoS | 2000-09 | 2000-2012* | 3261 | 8053 |

TABLE 1-continued

Data sets

| Dataset | Source | 10-Year Test Period | Full Period Available | Test Period # of Records | Total # of Records |
|---|---|---|---|---|---|
| Dye-Sensitized Solar Cells (DSSCs) | PatStat | 2001-2010 | 1957-2013 (early years inappropriate) | 2954 | 4872 |
| Nano-Enabled Drug Delivery (NEDD) | MEDLINE | 2001-2010 | 2000-2013 | | 10354 |
| NEDD | WoS | 2000-2009 | 2000-2012 | | 50745 |

*13196 records available for 1991-2014.

After providing the data sets, a time period is selected for analysis and processing of the data sets. In further aspects, the time period is partitioned into two periods, a base period and an active period. For the present example, a ten-year period was used, but any desired time period can be used. In some aspects, shorter periods could enable calculation of emergence indicators for newer technologies. For example, the disclosed EI script allows a user to provide some number of years of data as the "Year field" and can change the "Number of Baseline Years" from those data. The current example used a 3-year base period plus a 7-year active period. For partial last year(s), the data can optionally be deleted.

In further aspects, the data sets were then analyzed to identify a set of topical terms, drawing on title and abstract phrases in the present example. Other sources for topical terms could include, for example, various forms of keywords (e.g., Keywords-Author and Keywords-Plus; MeSH index terms, imported keywords, etc.), extracted abstract and/or title phrases, or extracted single words (unigrams) instead of phrases, or combinations thereof. While the present examples use field-structured abstract records of publications or patents, the methods and systems of the disclosed platform are not limited to those data. To this end, the platform can utilize semi-structured data, for example, data in the form of descriptive text and a time indicator. In some aspects and embodiments, the data can optionally comprise additional data parameters which can be utilized to generate secondary emergence indicators.

Next, the topical terms were then used to determine a first set of candidate terms by refining the topical terms using various data cleaning and consolidation steps. These steps involved a series of semi-automated fuzzy matching routines, application of thesauri, and/or term clumping algorithms.

For each data set, the set of remaining terms were then input into the EI script for further processing to determine a set of candidate emergent terms. In order for a term to be retained in the candidate emergent term group, the term met predetermined criteria for chosen thresholds. For example, term appearance in a minimum number of records; appearance in records from a minimum number of years; appearance in a maximum percentage of records in a period; appearance in a minimum active to base period ratio; or the like. In the present example, the selected thresholds were: appear in at least 7 records; appear in records from at least 3 years; a ratio of records containing the term in the active period to those in the base period of at least 2:1; the term did not appear in 15% or more of the base period records; terms were also required to have more than one author that doesn't share the same record set. For example, for the "Big Data" dataset, there were 5,992 abstract records for the 10-year period [3 base years plus 7 active years]. After the cleaning/consolidation process described herein, there were 19,370 terms remaining in the first set. After further processing, 1,070 terms met the above listed thresholds and were included in the second set of candidate terms.

Next, for each of the candidate terms in the second set, an Emergence Score ("EScore" or "ESc") was calculated and assigned for each term utilizing trend analyses of time series data. As described herein, various component trend values can be used to formulate EScores. In the present example, four distinct component trend values were calculated for each term—one trend formulation value focused on the active period; two reflecting recent trending; and one based on the early active period. The four exemplary component trends value were: last 3-year slope divided by the first 3-year slope for the active period; recent trend—comparing the change from the most recent 2 years to the prior 2 years; slope from the mid-year of the active period to the most recent year; and slope from first point to mid-point. As would be appreciated by one of skill in the art, various emergence score formulations can be produced based on different combinations of the trend values using Applicant's disclosure. In the present example, an additive formulation model ("EScore5" or "ESc5"), which utilized three of the four component trend values, was used to generate EScores for each term. Specifically, the formula was EScore=2*Active Period Trend+(Recent Trend+Mid-Year to Last Year Slope). For a given term with 7 periods of active data, the calculations would be: Active Period Trend=Terms Record Count of period 5, 6, 7/Summation(Square Root (Total Record Counts in period 5, 6, 7))—Terms Record Count of period 1, 2, 3/Summation(Square Root(Total Record Counts in period 1, 2, 3)); Recent Trend=10*(Terms Record Count of period 6, 7/Summation(Square Root(Total Record Counts in period 6, 7))—Terms Record Count of period 4, 5/Summation(Square Root(Total Record Counts in period 4, 5))); and Mid-Year To Last Year Slope=10*(Terms Record Count of period 7/Square Root(Total Record Counts in period 7)—Terms Record Count of period 4/Square Root(Total Record Counts in period 4)/Change in Time (e.g. period 7—period 4)). Various options can be generated by weighting whichever trend components one desires in calculating EScores.

EScore predictive utility in anticipating research activity during the three years following a 10-year analysis period was also evaluated. For this testing, 10+3-year sets of WoS data for Non-Linear Programming (2003-12+2013-15); DSSCs (2000-09+2010-12); and BD (2004-13+2014-5) were used. The measure of emergence in this test was term prominence in the test period, or the average # of records (e.g., publication records in a data set) in which the candidate emergence terms appeared in the 3-year period. The candidate emergent terms publication activity in the test period was then compared with the activity of other terms. The results are shown in Table 2 below. As shown in row g, the results for the several non-emergent term sets (e.g., ESc5 less than 1 or negative) for DSSCs data set were consolidated.

technologies, technical domains or fields. In some aspects, determining who is emergent at the organization, individual, or country level can be based on terms or records. While the present example utilized records (e.g., examining total or average attributes of an organization's publications), alternative embodiments can utilize total or average term usage directly.

TABLE 2

Predictive Utility of Candidate Emergence Terms in Three Test Datasets

| Dataset | | ESc5 < 0 | ESc5 <1&>0 | ESc5 <2&>1 | ESc5 >2 | ESc5 >2 not ET | ESc5 >2&ET | ET not ESc5 >2 | ET |
|---|---|---|---|---|---|---|---|---|---|
| a) BD | # | 505 | 486 | 50 | 29 | 17 | 12 | 22 | 34 |
| b) Test Period | Avg. 2014-5 | 5.0 | 17.1 | 52.2 | 208.7 | 130.6 | 319.2 | 40.1 | 138.6 |
| c) Prior Period | Avg. 2004-13 | 10.7 | 13.1 | 38.1 | 120.9 | 119.8 | 122.3 | 31 | 63.2 |
| d) Non-Linear | # | 129 | 79 | 35 | 25 | 11 | 14 | 8 | 22 |
| e) Test Period | Avg. 2013-15 | 4.65 | 5.28 | 8.23 | 15.8 | 25.6 | 8.1 | 7.2 | 7.8 |
| f) Prior Period | Avg. 2010-12 | 3.48 | 5.05 | 7.43 | 13.8 | 19.9 | 9.0 | 7.2 | 8.4 |
| g) DSSCs | # | 683 | — | — | 70 | 25 | 45 | 45 | 90 |
| h) Test Period | Avg. 2010-12 | 37.1 | | | 149.7 | 184.4 | 130.8 | 59.0 | 94.7 |
| i) Prior Period | Avg. 2007-09 | 14.5 | | | 48.2 | 59.8 | 41.8 | 19.0 | 30.4 |

The first data columns (i.e., ESc5<0 or low ESc) can provide benchmarks against which to compare the emerging term measures (i.e., ESc5<2 or high ESc). To this end, the data show the relatively low activity values in the test periods for the low ESc5 terms. For example, for BD in the test period, the 505 terms with ESc5<0 scores had an average occurrence in 5 records for the 2014-15 time period. In contrast, the high ESc5 terms exhibited significantly more activity in the test period based on the primary emergence characteristic of term prominence. For example, for BD, the ESc5>2 terms had an average occurrence of 208.7 records compared to an average of 5 records for ESc5 <0 terms. The data also shows high ESc5 terms to be more active in the prior 3-year period, further demonstrating their emergent characteristics. For the BD and Non-Linear data sets, the ESc5>2 terms exhibited significantly higher activity even compared to the terms scoring between 1 and 2 (ESc5<1 &>0), indicating that terms with higher EScores (e.g., ESc5>2) better meet this measure of emergence or prominence criterion.

In contrast to binary metrics, emergence scores, according to various embodiments, can offer a continuous scaling with attractive potential for refined measurement. Furthermore, emergence scores can provide more flexibility in exploring alternative emergence criteria and applications. Using Applicant's disclosure, various EScore formulations can be selected in using the scores as either a continuous measure of a term's emergence attributes or to set a threshold for emergent vs. non-emergent terms. As described herein, the emergent terms can then be used to generate derivative or secondary indicators, for example, and without limitation, emergent organizations, countries, individuals, publications, A threshold level for ESc5 was selected for high emergence scoring terms to be used in generating secondary indicators. As described above, ESc5's>2 terms were found to be superior when compared to terms with lesser ESc5 values in anticipating future high level of activity in the next 3 years. However, in selecting a threshold for ESc5, the tradeoff of selecting a higher degree of emergence can be smaller numbers of terms. Based on the data, the square root of pi (1.77—i.e., a value between 1.5 and 2) was selected to allow a higher term count compared to ESc's>2 term counts. Thus, in this example, calculations regarding terms below that 1.77 threshold (e.g., less emergent or non-emergent terms) were not factored in generating secondary indicators. In alternative embodiments, the selected threshold can comprise a value greater than 0.

Utilizing the high ESc terms to generate secondary indicators can comprise using information on terms and/or records. For example, the terms per se, or records, can be used as the basis of determining emergent indicators.

Term-level EScores were compiled to compare organizations in the present, but compiling record-level EScores is also possible. Record-level EScores can also be used, for example, to detect potentially important R&D articles, proceedings papers, or patents that warrant further attention by users.

In the present example, the primary indicator of organizational emergence used was Total EScore (Total EScore=Summation of SQRT (EScores) above the chosen threshold [SQRT (Pi)=1.77], counting each time a term was used in a distinct record; but not crediting multiple occurrences within a record). In some aspects, a Normalized EScore measure (Normalized=Summation (as in Total EScore) divided by the SQRT of the number of records) can provide an attractive alternative to help in detecting or discerning organizational differences in R&D activity pertaining to high EScore topics (terms).

Figure 9A:
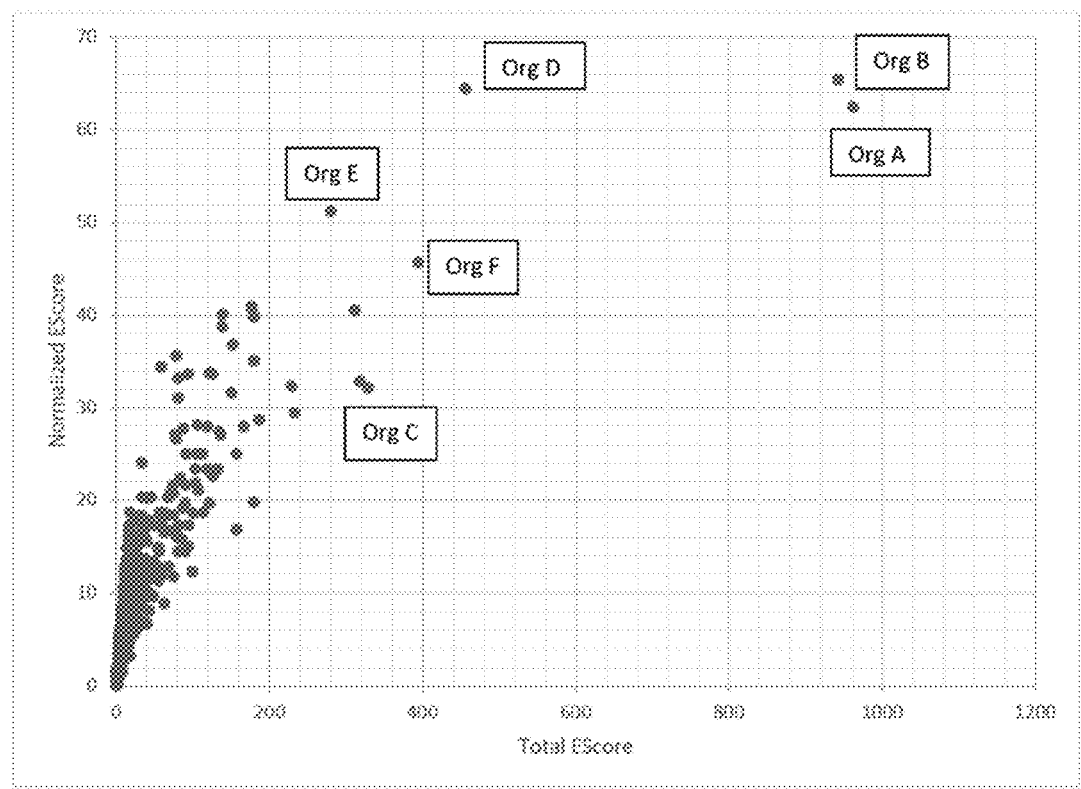
FIGS. 9A-9C depict graphs illustrating various EScores relating to organizations publishing on dye sensitized solar cells (DSSCs) as provided by the Platform in accordance with exemplary embodiments of the present disclosure.

FIG. 9A compares the Total and Normalized EScore measures for DSSCs. The exemplary primary indicator, Total EScore, is displayed along the horizontal axis of FIG. 9A. In one aspect, the Total EScore measure can be used as a prime signal of research organizations most actively publishing on "hot" or topics of great interest in the domain. By way of non-limiting example, were one seeking a collaborating organization, or a target university program to which to apply, embodiments of the present platform can be utilized to guide or make a selection. As shown in FIG. 9A, the leading organizations for 2003-2009 publications in WoS are the Organization A with 237 publications, Organization B with 207, and Organization C with 105. These record counts are directly observable in FIGS. 9B and 9C as detailed below.

Figure 9B:
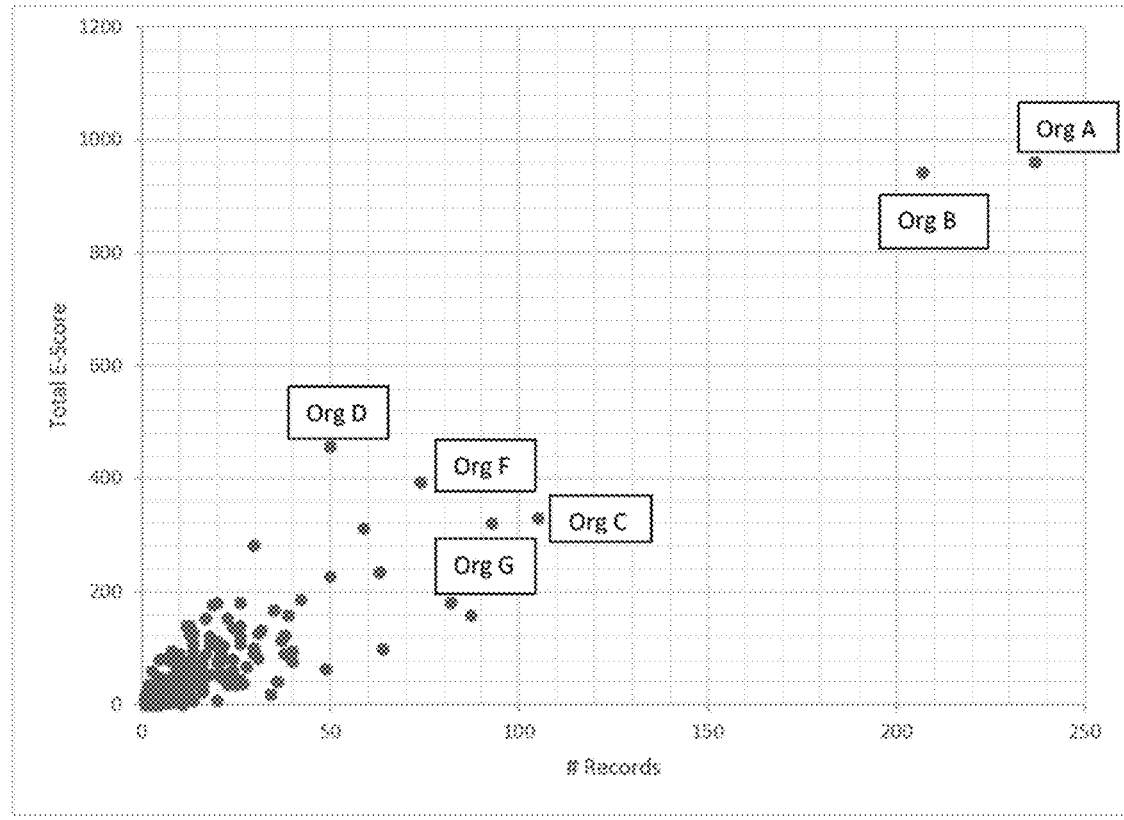

FIG. 9B shows the Total EScore versus number of publication records for DSSCs. These data show the amount of publication activity explicitly, so in some aspects, a decisionmaker can factor the generated information into decisions on which organizations hold greatest interest.

Figure 9C:
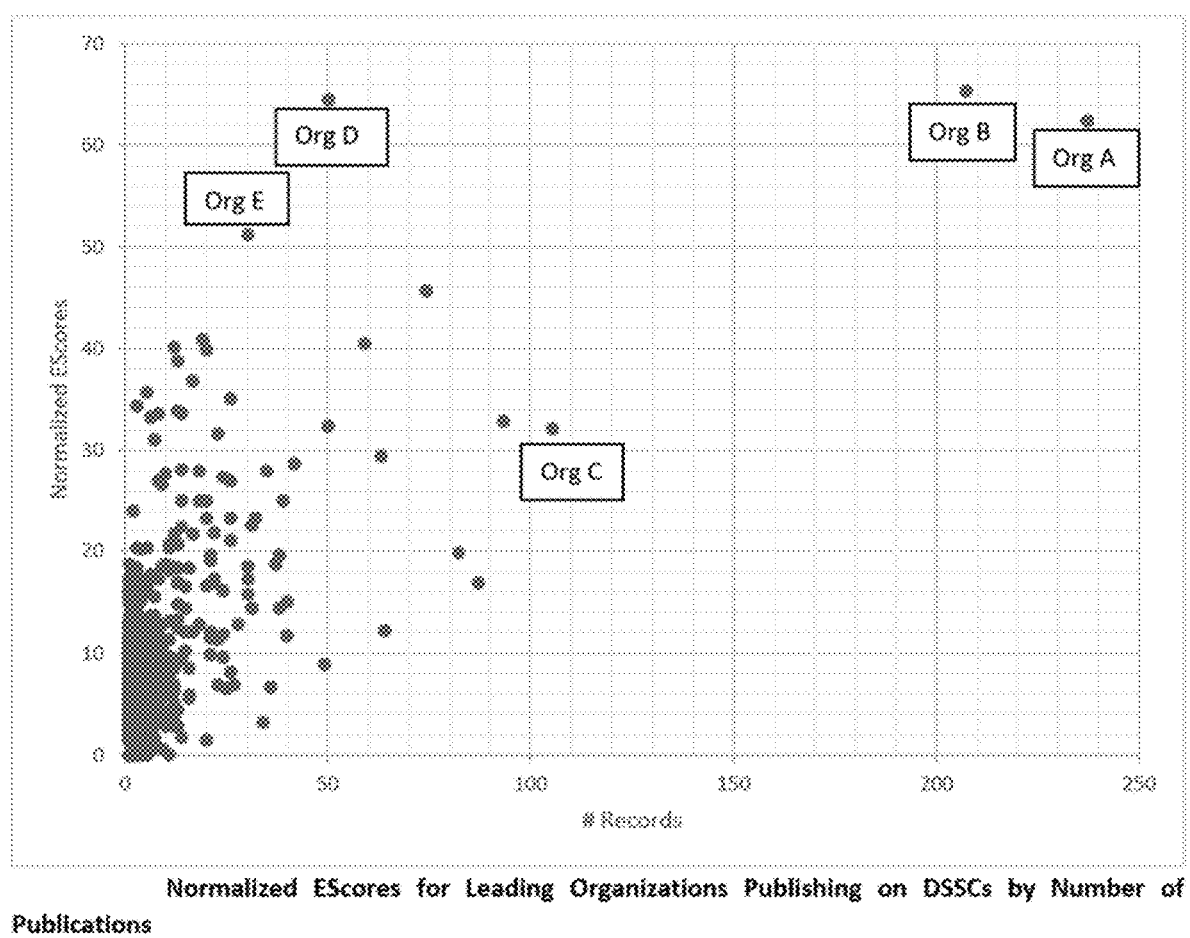

FIG. 9C shows the Normalized EScores versus total publications by the given organization. In other aspects, this secondary indicator could help identify smaller research operations active at the frontier. This Normalized EScore may be helpful in locating an R&D unit target for merger or acquisition (especially using patent data) or other smaller scale, yet cutting-edge, operation. For example, consider the DSSC publications of Organization D—it generates a high Total EScore from its 50 records (FIG. 9B), with that high rate showing strongly in FIG. 9C.

In some aspects, low record counts may be excluded. For the present example, the minimum counts selected were 10 records for countries; 8 for organizations; and 3 for authors. In various aspects, the platform can screen out low scores using the Normalized EScore measure. However, in further aspects, the present invention provides flexibility such that very low record count organizations can be explored and analyzed to find particular interests.

In various aspects, determining emergent organizations is not limited to using term-based EScores. These data can be augmented using additional EScore-based measures or using other measures. For example, use of additional EScore-based measures could include: distinct high EScore terms (e.g., set a minimum so that organizations with more diverse term use are favored); number of high EScore authors (or inventors) of the organization in question (e.g., valuing diversity by setting a minimum or scoring the number); collaboration with other high EScore organizations (e.g., favoring well-networked organizations); or location in a high EScore country. To avoid multiple potential dependencies, a standard sequence of assigning emergence scores can be assigned. An exemplary sequence of assigning emergence scores can comprise (in order): terms, records (paper or patent abstracts), researchers, organizations, countries, and fields.

The prior section has provided results pertaining to determination of emergent organizations which can be used to identify key organizations active at the frontier of R&D in the domain to monitor as high priority (potential collaborators or competitors). Additional applications of technology emergence scoring can include: method and systems for early warning, for example, on component technologies within a domain that warrant attention as "emerging" [based on emergent terms]; high priority research papers or patents within that domain to examine [based on emergent records]; countries to track; cutting-edge authors; and relative R&D activity level of different technical domains (emergent fields).

Next, the disclosed methods and systems for technology emergence scoring can be used in identifying high EScore papers, for example, those addressing cutting-edge topics, potentially introducing the reader to novel concepts, methods, or applications. For example, the means to identify high EScore papers implemented in this example is: Total EScore=Summation of SQRT (EScores) above the chosen threshold [SQRT (Pi)=1.77] —for the qualifying papers. Given that EScores, in various aspects, reflect a combined measure based on trends and thresholds, they can be absolute measures in nature. To this end, more papers with a given level of EScore summation can be expected in a hot area (e.g., Big Data) than in a relatively staid one (e.g., Non-Linear Programming). Accordingly, depending on the purpose in mind, the "Top N" emergent papers for the domain under study may be included, rather than taking all papers above a given threshold. For example, for BD, a matrix of ISI #'s by EScore values can be produced; sorted on those values to restrict to those >1.77 (# is 36, with values ranging from 1.79 to 46.7), and then take the sum of SQRT (EScore) values above that threshold for each article. Sorting on those, having one or more instances of the term "Big Data" gets a record 6.83 Total EScore count [i.e., SQRT (46.7)]; the next largest count value is 2.94. So, setting a threshold for BD of 10 requires that record to have at least 3 of the terms present. There are 256 such records. More selectively, a top 10 of record Total EScore values would cut off at 18.56 ("Big Data" plus 5 other terms). The highest scoring record without "Big Data" scores 17.6, including 9 high EScoring terms. For this example, the Top 36 records were used (cutoff of 5.3)—this necessitated the term "Big Data" plus four other high EScore terms. Those are matched back and tagged as 36 "Hi Total EScoring" records for BD.

Prevalence of those high EScore papers for particular authors (or inventors), organizations, or countries can then be determined to explore those entities further. For instance, in a Competitive Technical Intelligence (CTI) embodiment of the present platform, in assessing a BD R&D organization, those of its papers (or patents) can be tagged as having high Total EScores.

Conversely, information can be matched on selected subsets of authors, organizations, or countries to enrich consideration of emergent papers. Papers could be further screened by the platform by adding information on whether one or more of a paper's authors are emergent and whether one or more of the authors' organizations score above the threshold to be designated emergent.

Figure 10A:
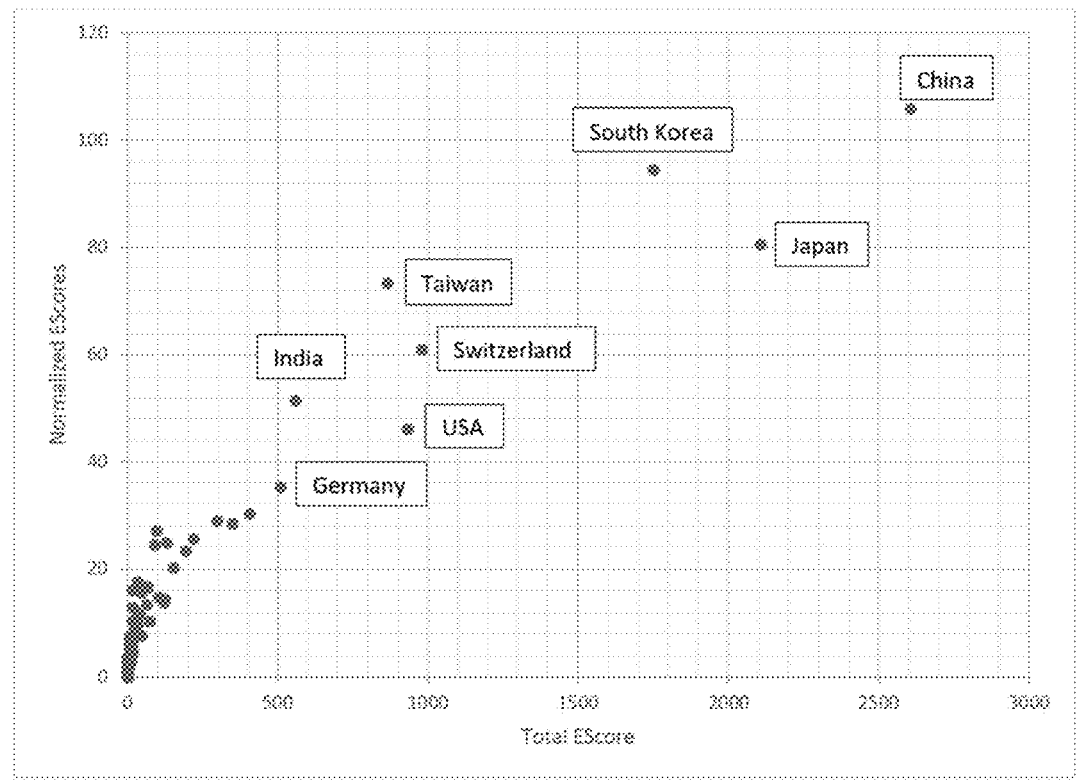
FIGS. 10A-10B depict graphs illustrating various EScores relating to organizations publishing on Big Data as provided by the Platform in accordance with exemplary embodiments of the present disclosure.
Figure 10B:
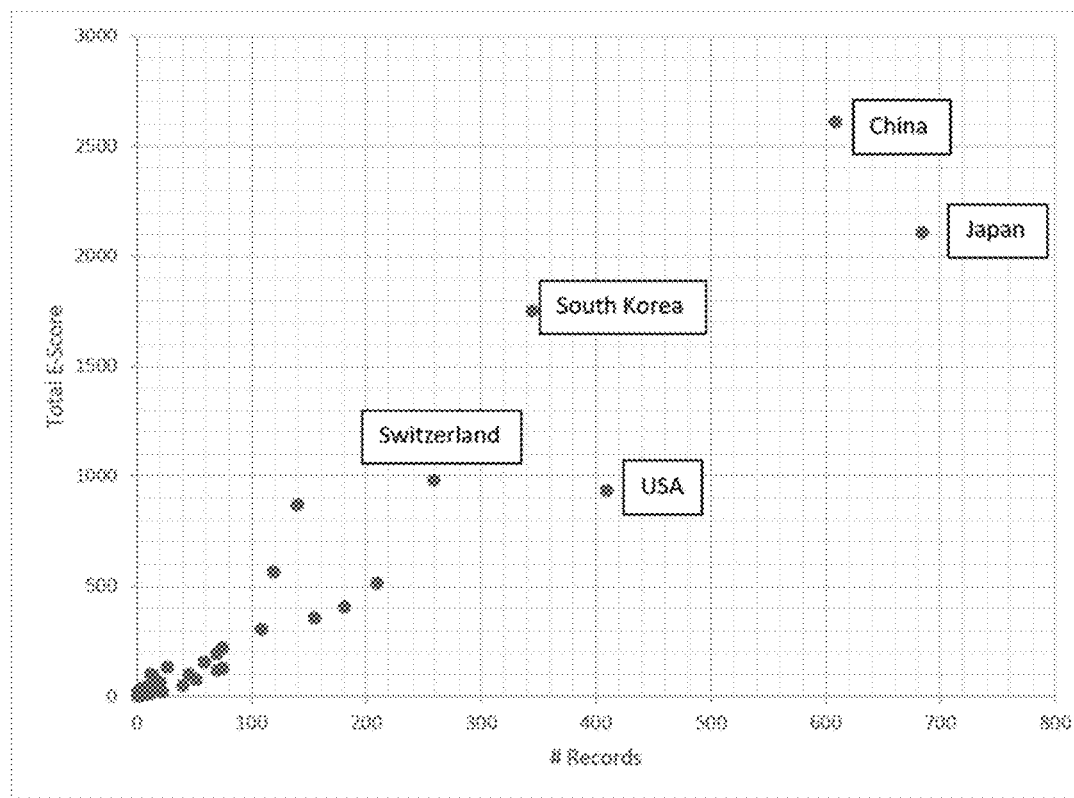

As an example of country analysis, the prominence of high EScore terms of a target country were compiled to benchmark countries (e.g., the leading countries in the domain). Total EScores (Summation of SQRT (EScores) above the chosen threshold [SQRT (Pi)=1.77]) were used as the main measure. Normalized EScores (Summation (as in "Total EScore") divided by the SQRT of the number of records) were used as a supporting additional measure. This approach was used to evaluate DSSC research which spans 25 years, and has a well-connected community with extensive cross-citation of research papers. To this end, leading authors have produced enormous numbers of research publications. At the country level, investigation can begin by tallying the number of publications and the extent to which those are cited. For example, DSSC research was initiated in Switzerland, and Swiss authors and organizations continue as highly emergent players. However, on the national level, FIG. 10A shows China, Japan, and South Korea out in front. Taiwan, Switzerland, and the USA stand as a second tier. FIG. 10B suggests high Total EScores with high publication counts. EScoring here presents a novel comparison between the USA and South Korea—the USA publishes more on DSSCs, but South Korea shows higher emergence scoring.

As described above, these technical domains provide different degrees of emergence. In some aspects, the platform can utilize actual trend slopes and absolute thresholds in determining the EScores, which in further aspects, can enable comparison of fields on degree of technical emergence. In various aspects, an exemplary comparative design configuration could include: for a set of multiple technical domains, retrieve suitable 10-year datasets. For each of those [e.g., Big Data, DSSCs, Non-Linear Programming ("NLP" here)], calculate: number of high EScoring terms (e.g., a possible threshold for consideration as "emergence" is 10 such terms); number of records above a Total EScoring threshold (here "10" was used; two of the three case examples in Table 3 below show heavy activity); number of emergent organizations (e.g., two show activity above the nominal threshold posed; number of emergent authors; and number of countries above threshold (here the differences among the three test domains are muted).

TABLE 3

Sample Emergent Field Measures

| Measure | Field | | |
|---|---|---|---|
| | Big Data | DSSCs | NLP |
| ESc terms >1.77 | 36 | 80 | 29 |
| ESc records >10 | 257 | 293 | 7 |
| Organizations Total EScore >100 | 7 | 39 | 0 |
| Authors Total EScore >40 | 22 | 246 | 0 |
| Country Total EScore >40 | 30 | 26 | 10 |

In further aspects, the variations between the young, hot field (BD) and the 25-year old one (DSSCs) determined by the platform are notable. DSSCs show more emergent terms and organizations and many more authors, suggesting the building of a substantial research community more than frantic activity at the frontier.

F. Aspects

The disclosed devices, systems, and methods include at least the following aspects. Aspect 1: A method for determining technical emergence of a term, comprising: accessing, by a system having at least one processor, a data set comprising a plurality of records having textual information, the plurality of records being from a predefined time interval having a base period and an active period; determining, by the system, from the data set, a set of terms meeting predetermined criteria; determining, by the system, at least one relative component value for each term for at least one of a portion of the predefined time interval; determining, by the system, a numeric score for each term based at least on the relative component value; and classifying, by the system, each term meeting a minimum numeric score as an emergent term; wherein the method is configured to provide analysis and predictive information related to the emergent term.

Aspect 2: The method of aspect 1, further comprising determining, by the system, a plurality of relative component values for each term for one or more portions of the predefined time interval.

Aspect 3: The method of any preceding aspects, wherein determining a set of terms further comprises extracting, by the system, all n-grams up to a predetermined length.

Aspect 4: The method of any preceding aspects, wherein determining a set of terms further comprises reducing, by the system, a size of a term set by applying at least one filter.

Aspect 5: The method of any preceding aspects, wherein determining at least one relative component value comprises assigning, by the system, a numeric value for each relative component value based on at least one trend analysis for the term.

Aspect 6: The method of any preceding aspects, wherein determining at least one relative component value comprises assigning, by the system, a numeric value for each relative component value based on at least one of the following: a) publication activity of a last portion of an active period minus publication activity of a first portion of the active period; b) publication activity of a first recent portion of the active period minus publication activity of an immediate prior portion of the active period; c) slope from a midpoint portion of the active period to a second recent portion of the active period; and d) slope from a first point portion of the active period to the mid-point portion of the active period.

Aspect 7: The method of any preceding aspects, wherein determining at least one relative component value comprises assigning, by the system, a numeric value for each relative component value based on at least one of the following: a) (number of records having at least one term instance from a last portion of an active period divided by the square root of the total number of records from said last portion of the active period) minus (number of records having at least one term instance from a first portion of the active period divided by the square root of the total number of records from said first portion of the active period); b) (number of records having at least one term instance from a first recent portion of an active period divided by the square root of the total number of records from said first recent portion of the active period) minus (number of records having at least one term instance from an immediate prior portion of the active period divided by the square root of the total number of records from said immediate prior portion of the active period); and c) (number of records having at least one term instance from a midpoint portion of the active period divided by the square root of the total number of records from said midpoint portion) minus (number of records having at least one term instance from a second recent portion of the active period divided by the square root of the total number of records from said second recent portion) divided by change in time from said midpoint portion and said second recent portion.

Aspect 8: The method of any preceding aspects, wherein determining at least one relative component value comprises assigning, by the system, a numeric value for each relative component value based on at least one of the following: a) change from the most recent 3-year period of an active period to the first 3-year period of the active period; b) change from the most recent 2-year period of the active period to the prior 2-year period; c) slope from mid-year of the active period to the most recent year of the active period; and d) slope from first year of the active period to mid-year of the active period.

Aspect 9: The method of any preceding aspects, wherein determining a numeric score further comprises applying, by the system, a predetermined weight to each relative component value to determine the numeric score.

Aspect 10: The method of any preceding aspects, wherein determining a numeric score further comprises at least one of: applying, by the system, a predetermined weight to each relative component value; and aggregating the relative component values.

Aspect 11: The method of any preceding aspects, further comprising generating, by the system, at least one indicator for a set of records sharing at least one feature, the at least one indicator being based on at least one of: summation of scores of terms having scores meeting a predetermined threshold; number of instances of terms having scores meeting a predetermined threshold; average score of terms having scores meeting a predetermined threshold for set of records; summation of a natural logarithm of scores of terms having scores meeting a predetermined threshold; average of a natural logarithm of scores of terms having scores meeting a predetermined threshold; summation of a square root of scores of terms having scores meeting a predetermined threshold; average of a square root of scores of terms having scores meeting a predetermined threshold; number of records from the set containing at least one instance of terms having scores meeting a predetermined threshold; percentage of records from the set containing at least one instance of terms having scores meeting a predetermined threshold; average score of terms having scores meeting a predetermined threshold and appearing within a record; percentage of records within the set meeting a predetermined average score; percentage of records within the set having a predetermined number of instances of terms having scores meeting a predetermined threshold and appearing within a record; number of unique terms having scores meeting a predetermined threshold; number of records meeting a predetermined score summation threshold; and combinations thereof.

Aspect 12: The method of any preceding aspects, wherein generating at least one indicator further comprises assigning a value to each indicator.

Aspect 13: The method of any preceding aspects, wherein the data set is received from a database.

Aspect 14: The method of any preceding aspects, wherein the records comprise documents.

Aspect 15: The method of any preceding aspects, wherein the documents comprise research publications or patent publications, or a combination thereof.

Aspect 16: The method of any preceding aspects, wherein the terms comprise abstract phrases or title phrases, or a combination thereof.

Aspect 17: The method of any preceding aspects, wherein the base period and the active period comprise the total time interval.

Aspect 18: The method of any preceding aspects, wherein the base period of the time interval comprises from about 1% to about 50% of the total time interval.

Aspect 19: The method of any preceding aspects, wherein the active period of the time interval comprises from about 50% to about 99% of the total time interval.

Aspect 20: The method of any preceding aspects, wherein the first portion of the time interval comprises from greater than 0 days to about 100 years.

Aspect 21: The method of any preceding aspects, wherein the second portion of the time interval comprises from greater than 0 days to about 100 years Aspect 22: The method of any preceding aspects, wherein the first portion of the time interval comprises from about 1% to about 50% of the total time interval.

Aspect 23: The method of any preceding aspects, wherein the second portion of the time interval comprises from about 50% to about 99% of the total time interval.

Aspect 24: The method of any preceding aspects, wherein the first portion of the time interval comprises from about a first 1% to about a first 50% of the total time interval.

Aspect 25: The method of any preceding aspects, wherein the second portion of the time interval comprises from about a second 50% to about a second 99% of the total time interval.

Aspect 26: A computer-readable non-transitory storage medium having a set of computer-accessible instructions which when executed, cause at least one processor to perform operations comprising: accessing a data set comprising a plurality of records having textual information, the plurality of records being from a predefined time interval having a base period and an active period; determining from the data set, a set of terms meeting predetermined criteria; determining at least one relative component value for each term for at least one of a portion of the predefined time interval; determining a numeric score for each term based on the relative component value; and classifying each term meeting a minimum numeric score as an emergent term.

Aspect 27: The medium of any preceding aspects, wherein the operations further comprise determining a plurality of relative component values for each term for one or more portions of the predefined time interval.

Aspect 28: The medium of any preceding aspects, wherein determining a set of terms further comprises reducing a size of a term set by applying at least one filter.

Aspect 29: The medium of any preceding aspects, wherein determining at least one relative component value comprises assigning a numeric value for each relative component value based on at least one trend analysis for the term.

Aspect 30: The medium of any preceding aspects, wherein determining at least one relative component value comprises assigning a numeric value for each relative component value based on at least one of the following: a) publication activity of a last portion of an active period minus publication activity of a first portion of the active period; b) publication activity of a first recent portion of the active period minus publication activity of an immediate prior portion of the active period; c) slope from a midpoint portion of the active period to a second recent portion of the active period; and d) slope from a first point portion of the active period to the mid-point portion of the active period.

Aspect 31: The medium of any preceding aspects, wherein determining a numeric score further comprises applying, by the system, a predetermined weight to each relative component value to determine the numeric score.

Aspect 32: The medium of any preceding aspects, wherein determining a numeric score further comprises at least one of: applying a predetermined weight to each relative component value; and aggregating the relative component values.

Aspect 33: The medium of any preceding aspects, wherein the operations further comprise generating at least one indicator for a set of records sharing at least one feature, the at least one indicator being based on at least one of: summation of scores of terms having scores meeting a predetermined threshold; number of instances of terms having scores meeting a predetermined threshold; average score of terms having scores meeting a predetermined threshold for set of records; summation of a natural logarithm of scores of terms having scores meeting a predetermined threshold; average of a natural logarithm of scores of terms having scores meeting a predetermined threshold; summation of a square root of scores of terms having scores meeting a predetermined threshold; average of a square root of scores of terms having scores meeting a predetermined threshold; number of records from the set containing at least one instance of terms having scores meeting a predetermined threshold; percentage of records from the set containing at least one instance of terms having scores meeting a predetermined threshold; average score of terms having scores meeting a predetermined threshold and appearing within a record; percentage of records within the set meeting a predetermined average score; percentage of records within the set having a predetermined number of instances of terms having scores meeting a predetermined threshold and appearing within a record; number of unique terms having scores meeting a predetermined threshold; number of records meeting a predetermined score summation threshold; and combinations thereof.

Aspect 34: The medium of any preceding aspects, wherein generating at least one indicator further comprises assigning a value to each indicator.

Aspect 35: The method or medium of any preceding aspects, wherein assigning a value comprises calculating a numeric summation of the square root of scores of terms having scores meeting a predetermined threshold for each first instance of the term within each record of the set.

Aspect 36: The method or medium of any preceding aspects, further comprising normalizing the numeric summation based on the number of records in the set, or square root of the number of records in the set.

Aspect 37: The method or medium of any preceding aspects, further comprising displaying the emergent terms comprising the numeric scores.

Aspect 38: The method or medium of any preceding aspects, further comprising displaying the at least one indicator.

Aspect 39: The method or medium of any preceding aspects, further comprising displaying a plurality of indicators for a plurality of record sets.

Aspect 40: A system for determining technical emergence of a term, comprising: at least one memory having computer-accessible instructions; and at least one processor functionally coupled to the at least one memory and configured by at least a portion of the computer-accessible instructions to access a data set comprising a plurality of records having textual information, the plurality of records being from a predefined time interval having a base period and an active period; to determine from the data set, a set of terms meeting predetermined criteria; to determine at least one relative component value for each term for at least one of a portion of the predefined time interval; to determine a numeric score for each term based on the relative component value; and to classify each term meeting a minimum numeric score as an emergent term.

Aspect 41: The system of any preceding aspects, wherein the at least one relative component value comprises a plurality of relative component values for each term for one or more portions of the predefined time interval.

Aspect 42: The method, medium, or system of any preceding aspects, wherein the plurality of relative component values comprises: a first relative component value for each term based on a first portion of the active period of the predefined time interval; a second relative component value for each term based on a second portion of the active period of the predefined time interval; and a third relative component value for each term based on a third portion of the active period of the predefined time interval.

Aspect 43: The system of any preceding aspects, wherein the at least one processor is further configured to determine a set of terms further comprises reducing a size of a term set by applying at least one filter.

Aspect 44: The method, medium, or system of any preceding aspects, wherein the at the least one filter includes at least one of: a) eliminating candidate terms that are present in a controlled vocabulary; b) applying a general fuzzy matching algorithm; c) applying a folding routine; d) eliminating candidate terms comprising a stopword; and e) combinations thereof.

Aspect 45: The method, medium, or system of any preceding aspects, wherein the predetermined criteria comprises at least one of: a) at least one term instance in a minimum number of records; b) at least one term instance in at least one record for a minimum number of record periods; c) at least one term instance in a maximum percentage of records from a predefined first portion of the time interval of the data set; d) a ratio of a number of records with at least one term instance from a predefined first portion of the time interval of the data set to a number of records with at least one term instance of the same term from a predefined second portion of the time interval of the data set of at least about 1:2; and e) at least one term instance in a plurality of records having different author data.

Aspect 46: The system of any preceding aspects, wherein the at least one processor is further configured to determine at least one relative component value comprises assigning a numeric value for each relative component value based on at least one trend analysis for the term.

Aspect 47: The system of any preceding aspects, wherein the at least one processor is further configured to assign a numeric value for each relative component value based on at least one of the following: a) publication activity of a last portion of an active period minus publication activity of a first portion of the active period; b) publication activity of a first recent portion of the active period minus publication activity of an immediate prior portion of the active period; c) slope from a midpoint portion of the active period to a second recent portion of the active period; and d) slope from a first point portion of the active period to the mid-point portion of the active period.

Aspect 48: The system of any preceding aspects, wherein the at least one processor is further configured to assign a numeric value for each relative component value based on at least one trend analysis for the term.

Aspect 49: The method, medium, or system of any preceding aspects, wherein the trend analysis comprises trend analysis of time series data.

Aspect 50: The system of any preceding aspects, wherein the at least one processor is further configured to determine a numeric score further comprises applying, by the system, a predetermined weight to each relative component value to determine the numeric score.

Aspect 51: The system of any preceding aspects, wherein the at least one processor is further configured to determine a numeric score further comprises at least one of: applying a predetermined weight to each relative component value; and aggregating the relative component values.

Aspect 52: The system of any preceding aspects, wherein the at least one processor is further configured to generate at least one indicator for a set of records sharing at least one feature, the at least one indicator being based on at least one of: summation of scores of terms having scores meeting a predetermined threshold; number of instances of terms having scores meeting a predetermined threshold; average score of terms having scores meeting a predetermined threshold for set of records; summation of a natural logarithm of scores of terms having scores meeting a predetermined threshold; average of a natural logarithm of scores of terms having scores meeting a predetermined threshold; summation of a square root of scores of terms having scores meeting a predetermined threshold; average of a square root of scores of terms having scores meeting a predetermined threshold; number of records from the set containing at least one instance of terms having scores meeting a predetermined threshold; percentage of records from the set containing at least one instance of terms having scores meeting a predetermined threshold; average score of terms having scores meeting a predetermined threshold and appearing within a record; percentage of records within the set meeting a predetermined average score; percentage of records within the set having a predetermined number of instances of terms having scores meeting a predetermined threshold and appearing within a record; number of unique terms having scores meeting a predetermined threshold; number of records meeting a predetermined score summation threshold; and combinations thereof.

Aspect 53: The system of any preceding aspects, wherein the at least one processor is further configured to assign a value to each indicator.

Aspect 54: The system of any preceding aspects, wherein the at least one processor is further configured to calculate a numeric summation of the square root of scores of terms having scores meeting a predetermined threshold for each first instance of the term within each record of the set.

Aspect 55: The system of any preceding aspects, wherein the at least one processor is further configured to normalize the numeric summation based on: the number of records in the set or square root of the number of records in the set.

Aspect 56: The method, medium, or system of any preceding aspects, wherein the feature relates to information associated with at least one of the following: a person; an organization; a country; a data source; a document type; a document section; a technology; a technical domain; a technical field; a time interval; a geographical location; patent class; and combinations thereof.

Aspect 57: The method, medium or system of any preceding aspects, further configured to transmit to the emergent terms comprising the numeric scores or the at least one indicator, or combinations thereof to a destination device having specific communication resources.

Aspect 58: The system of any preceding aspects, wherein the at least one processor is further configured to display the emergent terms comprising the numeric scores or the at least one indicator, or combinations thereof.

Aspect 59: The system of any preceding aspects, wherein the at least one processor is further configured to display a plurality of indicators for a plurality of record sets.

Aspect 60: The method, medium, or system of any preceding aspects, wherein the score is utilized in a Competitive Technical Intelligence (CTI) application, or a Technology Readiness Assessment (TRA), or a combination thereof.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications may be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. Insofar as the description above and the accompanying drawings disclose any additional subject matter that is not within the scope of the claims below, the disclosures are not dedicated to the public, and the right to file one or more applications to claims relating to such additional disclosures is reserved.

What is claimed:

1. A method for determining technical emergence of a term, comprising:

accessing, by a system having at least one processor, a data set comprising a plurality of records having textual information, the plurality of records resulting from a search, within a database comprising a document repository, using a search query identifying records having related technical content represented in the database, and the plurality of records also corresponding to a predefined time interval including a base period and an active period after the base period;

determining, by the system, from a subset of the plurality of records, a set of terms meeting predetermined criteria, wherein the subset of the plurality of records corresponds to the active period;

determining, by the system, a plurality of relative component value for each term in the set of terms for at least a portion of the predefined time interval;

determining, by the system, a numeric score for each term in the set of terms based at least on the plurality of relative component values including a first weight corresponding to publication activity during a last portion of the active period minus a second weight corresponding to publication activity during a first portion of the active period, a first weight corresponding to publication activity during a first recent portion of the active period minus a second weight corresponding to publication activity during an immediate prior portion of the active period, slope from a midpoint portion of the active period to a second recent portion of the active period, and slope from a first point portion of the active period to the mid-point portion of the active period;

determining that a first term in the set of terms has a first numeric score that meets or exceeds a threshold numeric score; and classifying, by the system, the first term as an emergent term.

2. The method of claim 1, wherein the plurality of relative component values comprises: a first relative component value for each term in the set of terms based on a first portion of the active period of the predefined time interval; a second relative component value for each term in the set of terms based on a second portion of the active period of the predefined time interval; and a third relative component value for each term in the set of terms based on a third portion of the active period of the predefined time interval.

3. The method of claim 1, wherein the predetermined criteria comprise at least one of:
   at least one term instance in a minimum number of records in the subset of the plurality of records;
   at least one term instance in at least one record in the subset of the plurality of records for a minimum number of record periods;
   at least one term instance in a maximum percentage of records from a predefined first portion of the active period;
   a ratio of a first number of records having at least one term instance from a predefined first portion of the predefined time interval to a second number of records having at least one term instance of the same term from a predefined second portion of the predefined time interval; or
   at least one term instance in a second subset of the plurality of records having different author data.

4. The method of claim 2, further comprising assigning, by the system, a numeric value for each of the following:
   a first weight corresponding to publication activity during a last portion of the active period minus a second weight corresponding to publication activity during a first portion of the active period;
   a first weight corresponding to publication activity during a first recent portion of the active period minus a second weight corresponding to publication activity during an immediate prior portion of the active period;
   slope from a midpoint portion of the active period to a second recent portion of the active period; and
   slope from a first point portion of the active period to the mid-point portion of the active period.

5. The method of claim 4, wherein determining a numeric score comprises at least one of: applying, by the system, a predetermined weight to each relative component value; and aggregating the relative component values.

6. The method of claim 5, further comprising generating, by the system, at least one indicator for a set of second records comprising records sharing at least one feature, the at least one indicator being based on at least one of:
   summation of scores of terms having scores meeting a predetermined threshold;
   number of instances of terms having scores meeting a predetermined threshold;
   average score of terms having scores meeting a predetermined threshold for the set of second records;
   summation of a natural logarithm of scores of terms having scores meeting a predetermined threshold;
   average of a natural logarithm of scores of terms having scores meeting a predetermined threshold;
   summation of a square root of scores of terms having scores meeting a predetermined threshold;
   average of a square root of scores of terms having scores meeting a predetermined threshold;
   number of records from the set containing at least one instance of terms having scores meeting a predetermined threshold;
   percentage of records from the set containing at least one instance of terms having scores meeting a predetermined threshold;
   average score of terms having scores meeting a predetermined threshold and appearing within a record;
   percentage of records within the set meeting a predetermined average score; percentage of records within the set having a predetermined number of instances of terms having scores meeting a predetermined threshold and appearing within a record;
   number of unique terms having scores meeting a predetermined threshold; and number of records meeting a predetermined score summation threshold.

7. The method of claim 6, wherein generating at least one indicator comprises assigning a value to an indicator of the at least one indicator by calculating a numeric summation of square root of values of respective scores of terms, each one of the respective score of terms meeting a predetermined threshold for each first instance of the term within each record of the set of second records.

8. The method of claim 7, further comprising displaying, by the system, at least one indicator related to at least one record of the set of second record.

9. A computer-readable non-transitory storage medium having computer accessible instructions which when executed, cause at least one processor to perform operations comprising:
   accessing a data set comprising a plurality of records having textual information, the plurality of records resulting from a search, within a database comprising a document repository, using a search query identifying records having related technical content represented in the database, and the plurality of records also corresponding to a predefined time interval including a base period and an active period after the base period;
   determining a set of terms from a subset of the plurality of records, the set of terms satisfying criteria including:
   at least one term instance in a minimum number of records;
   at least one term instance in at least one record for a minimum number of record periods;
   at least one term instance in a defined percentage of records from a predefined first portion of the active period;
   a ratio of a first number of records having at least one term instance from a predefined first portion of the predefined time interval to a second number of records having at least one term instance of a same term from a predefined second portion of the predefined time interval; and
   at least one term instance in a plurality of records having different author data, wherein the subset of the plurality of records corresponds to the active period;
   determining a plurality of relative component values for each term for one or more portions of the predefined time interval;
   determining a numeric score for each term of the set of terms based on the plurality of relative component values, including a first weight corresponding to publication activity during a last portion of the active period minus a second weight corresponding to publication activity during a first portion of the active period, a first weight corresponding to publication activity during a first recent portion of the active period minus a second weight corresponding to publication activity during an immediate prior portion of the active period, slope from a midpoint portion of the active period to a second recent portion of the active period, and slope from a first point portion of the active period to the mid-point portion of the active period;

determining that a first term in the set of terms has a first numeric score that meets or exceeds a threshold numeric score; and classifying the first term as an emergent term.

10. The computer-readable non-transitory storage medium of claim 9, wherein the plurality of relative component values comprises at least one of: a first relative component value for each term based on a first portion of the active period of the predefined time interval; a second relative component value for each term based on a second portion of the active period of the predefined time interval; and a third relative component value for each term based on a third portion of the active period of the predefined time interval.

11. The computer-readable non-transitory storage medium of claim 9, wherein determining the plurality of relative component values comprises assigning a numeric value for each relative component value based on at least one trend analysis of time series data; and at least one of: applying a predetermined weight to each relative component value.

12. The computer-readable non-transitory storage medium of claim 10, wherein the operations further comprise generating at least one indicator for a set of second records having at least one feature in common, the at least one indicator being based on at least one of:

summation of scores of terms having scores meeting a predetermined threshold;

number of instances of terms having scores meeting a predetermined threshold;

average score of terms having scores meeting a predetermined threshold for set of second records;

summation of a natural logarithm of scores of terms having scores meeting a predetermined threshold;

average of a natural logarithm of scores of terms having scores meeting a predetermined threshold;

summation of a square root of scores of terms having scores meeting a predetermined threshold;

average of a square root of scores of terms having scores meeting a predetermined threshold;

number of records from the set containing at least one instance of terms having scores meeting a predetermined threshold;

percentage of records from the set containing at least one instance of terms having scores meeting a predetermined threshold;

average score of terms having scores meeting a predetermined threshold and appearing within a record;

percentage of records within the set meeting a predetermined average score; percentage of records within the set having a predetermined number of instances of terms having scores meeting a predetermined threshold and appearing within a record;

number of unique terms having scores meeting a predetermined threshold; number of records meeting a predetermined score summation threshold; and assigning a value to each indicator;

wherein a first feature of the at least one feature in common relates to information associated with at least one of the following: a person; an organization; a country; a data source; a document type; a document section; a technology; a technical domain; a technical field; a time interval; a geographical location; and a patent class.

13. The computer-readable non-transitory storage medium of claim 12, wherein the assigning the value comprises calculating a numeric summation of square root values of respective scores of terms, each one of the respective score of terms meeting a predetermined threshold for each first instance of the term within each record of the set of second records.

14. The computer-readable non-transitory storage medium of claim 13, wherein the operations further comprise displaying at least one of: the emergent term comprising the numeric scores; at least one indicator; and a plurality of indicators for a plurality of record sets.

15. A system, comprising:
at least one memory device having computer-accessible instructions; and
at least one processor functionally coupled to the at least one memory device and configured by at least a portion of the computer-accessible instructions to:
access a data set comprising a plurality of records having textual information, the plurality of records resulting from a search, within a database comprising a document repository, using a search query identifying records having related technical content represented in the database, and the plurality of records also corresponding to a predefined time interval including a base period and an active period after the base period;
determine, from a subset of the plurality of records, a set of terms meeting predetermined criteria, wherein the subset of the plurality of records corresponds to the active period;
determine a plurality of relative component values for each term in the set of terms for at least a portion of the predefined time interval;
determine a numeric score for each term in the set of terms based on the plurality of relative component values including a first weight corresponding to publication activity during a last portion of the active period minus a second weight corresponding to publication activity during a first portion of the active period, a first weight corresponding to publication activity during a first recent portion of the active period minus a second weight corresponding to publication activity during an immediate prior portion of the active period, slope from a midpoint portion of the active period to a second recent portion of the active period, and slope from a first point portion of the active period to the mid-point portion of the active period;
classify each term in the set of terms meeting a minimum numeric score as an emergent term; and
generate at least one indicator having a numeric value for a set of records,
wherein each record in the set of records contains at least one shared attribute associated with at least one of the following: a person; an organization; a country; a technology; a technical domain; a technical field; a time interval; a geographical location; and a patent class.

16. The system of claim 15, wherein the plurality of relative component values comprises: a first relative component value for each term in the set of terms based on a first portion of the active period of the predefined time interval; a second relative component value for each term in the set of terms based on a second portion of the active period of the predefined time interval; and a third relative component value for each term in the set of terms based on a third portion of the active period of the predefined time interval.

17. The system of claim 16, wherein the predetermined criteria comprise at least one of: at least one term instance in a minimum number of records;
at least one term instance in at least one record for a minimum number of record periods;
at least one term instance in a maximum percentage of records from a predefined first portion of the active period;
a ratio of a number of records with at least one term instance from a predefined first portion of the active period to a number of records with at least one term instance of the same term from a predefined second portion of the active period of at least about 1:2; and
at least one term instance in a plurality of records having different author data.

18. The system of claim 15, wherein the at least one processor is further configured to assign a numeric value for each of the following:
a first weight corresponding to publication activity during a last portion of the active period minus a second weight corresponding to publication activity during a first portion of the active period;
a first weight corresponding to publication activity during a first recent portion of the active period minus a second weight corresponding to publication activity during an immediate prior portion of the active period;
slope from a midpoint portion of the active period to a second recent portion of the active period; and
slope from a first point portion of the active period to the mid-point portion of the active period.

19. The system of claim 15, wherein the at least one indicator is based on at least one of:
summation of scores of terms having scores meeting a predetermined threshold;
number of instances of terms having scores meeting a predetermined threshold;
average score of terms having scores meeting a predetermined threshold for set of second records;
summation of a natural logarithm of scores of terms having scores meeting a predetermined threshold;
average of a natural logarithm of scores of terms having scores meeting a predetermined threshold;
summation of a square root of scores of terms having scores meeting a predetermined threshold;
average of a square root of scores of terms having scores meeting a predetermined threshold;
number of records from the set containing at least one instance of terms having scores meeting a predetermined threshold;
percentage of records from the set containing at least one instance of terms having scores meeting a predetermined threshold;
average score of terms having scores meeting a predetermined threshold and appearing within a record;
percentage of records within the set meeting a predetermined average score; percentage of records within the set having a predetermined number of instances of terms having scores meeting a predetermined threshold and appearing within a record; and
number of unique terms having scores meeting a predetermined threshold.

20. The system of claim 19, wherein the at least one processor is further configured to calculate a numeric summation of square root values of respective scores of terms, each one of the respective score of terms meeting a predetermined threshold for each first instance of the term within each record of the set.

21. The computer-readable non-transitory storage of claim 9, wherein the ratio is at least about 1:2.

22. The computer-readable non-transitory storage of claim 9, wherein the criteria further comprise at least one term instance in a minimum number of records.

23. The computer-readable non-transitory storage of claim 9, wherein the criteria further comprise at least one term instance in a defined percentage of records from a predefined first portion of the active period.

* * * * *